(12) United States Patent
Kakutani et al.

(10) Patent No.: US 7,764,402 B2
(45) Date of Patent: Jul. 27, 2010

(54) FAST GENERATION OF DITHER MATRIX

(75) Inventors: Toshiaki Kakutani, Shiojiri (JP); Kimito Katsuyama, Minamiashigawa (JP)

(73) Assignee: Seiko Epson Corporation, Tokyo (JP)

( * ) Notice: Subject to any disclaimer, the term of this patent is extended or adjusted under 35 U.S.C. 154(b) by 798 days.

(21) Appl. No.: 11/724,950

(22) Filed: Mar. 15, 2007

(65) Prior Publication Data
US 2007/0258110 A1 Nov. 8, 2007

(30) Foreign Application Priority Data
Mar. 17, 2006 (JP) .............................. 2006-074170

(51) Int. Cl.
*H04N 1/40* (2006.01)
*H04N 1/405* (2006.01)

(52) U.S. Cl. ...................... 358/3.13; 358/1.9; 358/3.02; 358/3.06; 347/15

(58) Field of Classification Search ................ 358/3.13, 358/3.14, 3.16, 1.9, 3.06; 347/15
See application file for complete search history.

(56) References Cited

U.S. PATENT DOCUMENTS

| 5,946,452 | A | 8/1999 | Spaulding et al. | |
|---|---|---|---|---|
| 7,387,355 | B2 * | 6/2008 | Kakutani | 347/15 |

(Continued)

FOREIGN PATENT DOCUMENTS

| JP | 07-081190 | 3/1995 |
|---|---|---|

(Continued)

OTHER PUBLICATIONS

Abstract of Japanese Patent Publication No. JP 07-081190, Pub. Date: Mar. 28, 1995, Patent Abstracts of Japan.

(Continued)

*Primary Examiner*—King Y Poon
*Assistant Examiner*—Lawrence E Wills
(74) *Attorney, Agent, or Firm*—Martine Penilla & Gencarella, LLP

(57) ABSTRACT

The invention provides a dither matrix generating method. This method generates a dither matrix for determining a status of dot formation on each of print pixels of a print image to be formed on a print medium in response to input image data. The method comprising: determining a targeted threshold value from among a plurality of threshold values, the targeted threshold value having a highest tendency for dot formation to be On among threshold values for which storage elements are to be determined; determining a storage element for the targeted threshold value from among a plurality of candidate storage elements based on a matrix evaluation value, the matrix evaluation value representing a correlation with a prescribed objective state, the matrix evaluation value being calculated respectively on a presupposition of hypothetical dot On/Off states, the hypothetical dot On/Off states resulting from the targeted threshold value being stored in each of the plurality of candidate storage elements that are candidates for storing the targeted threshold value; and repeating the determining the targeted threshold value and the determining the storage element for at least part of the plurality of threshold values. The determining the storage element includes: extracting an element block that constitutes a group of the storage elements, the element block making up a part of the dither matrix; and selecting the candidate storage elements in succession from among the plurality of storage elements that make up the extracted element block.

9 Claims, 21 Drawing Sheets

U.S. PATENT DOCUMENTS

| | | | |
|---|---|---|---|
| 2006/0193010 A1* | 8/2006 | Kakutani | 358/3.13 |
| 2007/0058202 A1* | 3/2007 | Kakutani | 358/3.06 |
| 2007/0058204 A1* | 3/2007 | Kakutani | 358/3.13 |
| 2007/0091134 A1* | 4/2007 | Kakutani | 347/15 |
| 2008/0259361 A1* | 10/2008 | Kakutani | 358/1.8 |

FOREIGN PATENT DOCUMENTS

| | | |
|---|---|---|
| JP | 07-177351 | 7/1995 |
| JP | 10-262151 | 9/1998 |
| JP | 10-275228 | 10/1998 |
| JP | 10-329381 | 12/1998 |
| JP | 2004-015780 | 1/2004 |

OTHER PUBLICATIONS

Abstract of Japanese Patent Publication No. JP 07-177351, Pub. Date: Jul. 14, 1995, Patent Abstracts of Japan.

Abstract of Japanese Patent Publication No. JP 10-329381, Pub. Date: Dec. 15, 1998, Patent Abstracts of Japan.

Abstract of Japanese Patent Publication No. JP 10-262151, Pub. Date: Sep. 29, 1998, Patent Abstracts of Japan.

Abstract of Japanese Patent Publication No. JP 10-275228, Pub. Date: Oct. 13, 1998, Patent Abstracts of Japan.

Abstract of Japanese Patent Publication No. JP 2004-015780, Pub. Date: Jan. 15, 2004, Patent Abstracts of Japan.

* cited by examiner $$VTF(u) = 5.05 \cdot \exp\left(\frac{-0.138\,\pi\,L\cdot u}{180}\right)$$
$$\cdot \left\{1 - \exp\left(\frac{-0.1\,\pi\,L\cdot u}{180}\right)\right\}$$

$$\text{GRAININESS INDEX} = K \int FS(u) \cdot VTF(u)\,du$$

Fig.9

CORRESPONDING DOT ON STATE OF
ALREADY-DETERMINED THRESHOLD VALUES

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  | ● |  |  |  |  |  |  |
| COLUMN 3 |  |  |  |  |  | ● |  |  |
| COLUMN 4 | ● |  |  |  |  |  |  |  |
| COLUMN 5 |  |  | ● |  |  |  |  |  |
| COLUMN 6 |  |  |  |  |  |  |  | ● |
| COLUMN 7 |  |  |  | ● |  |  |  |  |
| COLUMN 8 |  |  |  |  |  |  | ● |  |

Dpm

Fig.10

ELEMENT BLOCK SELECTION PROCESS

EB1

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  | ● |  |  |  |  |  |  |
| COLUMN 3 |  |  |  |  |  | ● |  |  |
| COLUMN 4 | ● |  |  |  |  |  |  |  |
| COLUMN 5 |  |  | ● |  |  |  |  |  |
| COLUMN 6 |  |  |  |  |  |  |  | ● |
| COLUMN 7 |  |  |  | ● |  |  |  |  |
| COLUMN 8 |  |  |  |  |  |  | ● |  |

|  | ROW 1 | ROW 2 | ROW 3 | ROW 4 |
|---|---|---|---|---|
| COLUMN 1 | * |  |  |  |
| COLUMN 2 |  | ● |  |  |
| COLUMN 3 |  |  |  |  |
| COLUMN 4 | ● |  |  |  |

DOT ON/OFF STATE (DIGITIZED)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 1 | 0 | 0 | 0 | 1 | 0 | 0 | 0 |
| COLUMN 2 | 0 | 1 | 0 | 0 | 0 | 0 | 0 | 0 |
| COLUMN 3 | 0 | 0 | 0 | 0 | 0 | 1 | 0 | 0 |
| COLUMN 4 | 1 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 1 |
| COLUMN 7 | 0 | 0 | 0 | 1 | 0 | 0 | 0 | 0 |
| COLUMN 8 | 0 | 0 | 0 | 0 | 0 | 0 | 1 | 0 |

Ddm

EMBODIMENT 2

Fig.18

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 1 | 0 | 1 | 0 | 1 | 0 | 1 |
| COLUMN 2 | 2 | 3 | 2 | 3 | 2 | 3 | 2 | 3 |
| COLUMN 3 | 0 | 1 | 0 | 1 | 0 | 1 | 0 | 1 |
| COLUMN 4 | 2 | 3 | 2 | 3 | 2 | 3 | 2 | 3 |
| COLUMN 5 | 0 | 1 | 0 | 1 | 0 | 1 | 0 | 1 |
| COLUMN 6 | 2 | 3 | 2 | 3 | 2 | 3 | 2 | 3 |
| COLUMN 7 | 0 | 1 | 0 | 1 | 0 | 1 | 0 | 1 |
| COLUMN 8 | 2 | 3 | 2 | 3 | 2 | 3 | 2 | 3 |

|  | 1 | 2 | 3 | 4 | 5 | 6 | 7 | 8 |
|---|---|---|---|---|---|---|---|---|
| 1 | 0 |  | 0 |  | 0 |  | 0 |  |
| 2 |  |  |  |  |  |  |  |  |
| 3 | 0 |  | 0 |  | 0 |  | 0 |  |
| 4 |  |  |  |  |  |  |  |  |
| 5 | 0 |  | 0 |  | 0 |  | 0 |  |
| 6 |  |  |  |  |  |  |  |  |
| 7 | 0 |  | 0 |  | 0 |  | 0 |  |
| 8 |  |  |  |  |  |  |  |  |

M1:

|  | 1 | 2 | 3 | 4 | 5 | 6 | 7 | 8 |
|---|---|---|---|---|---|---|---|---|
| 1 |  | 1 |  | 1 |  | 1 |  | 1 |
| 2 |  |  |  |  |  |  |  |  |
| 3 |  | 1 |  | 1 |  | 1 |  | 1 |
| 4 |  |  |  |  |  |  |  |  |
| 5 |  | 1 |  | 1 |  | 1 |  | 1 |
| 6 |  |  |  |  |  |  |  |  |
| 7 |  | 1 |  | 1 |  | 1 |  | 1 |
| 8 |  |  |  |  |  |  |  |  |

M2:

|  | 1 | 2 | 3 | 4 | 5 | 6 | 7 | 8 |
|---|---|---|---|---|---|---|---|---|
| 1 |  |  |  |  |  |  |  |  |
| 2 | 2 |  | 2 |  | 2 |  | 2 |  |
| 3 |  |  |  |  |  |  |  |  |
| 4 | 2 |  | 2 |  | 2 |  | 2 |  |
| 5 |  |  |  |  |  |  |  |  |
| 6 | 2 |  | 2 |  | 2 |  | 2 |  |
| 7 |  |  |  |  |  |  |  |  |
| 8 | 2 |  | 2 |  | 2 |  | 2 |  |

M3:

|  | 1 | 2 | 3 | 4 | 5 | 6 | 7 | 8 |
|---|---|---|---|---|---|---|---|---|
| 1 |  |  |  |  |  |  |  |  |
| 2 |  | 3 |  | 3 |  | 3 |  | 3 |
| 3 |  |  |  |  |  |  |  |  |
| 4 |  | 3 |  | 3 |  | 3 |  | 3 |
| 5 |  |  |  |  |  |  |  |  |
| 6 |  | 3 |  | 3 |  | 3 |  | 3 |
| 7 |  |  |  |  |  |  |  |  |
| 8 |  | 3 |  | 3 |  | 3 |  | 3 |

Fig.22

DOT ON/OFF STATE (DIGITIZED)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 1 | 0 | 0 | 0 | 1 | 0 | 0 | 0 |
| COLUMN 2 | 0 | 1 | 0 | 0 | 0 | 0 | 0 | 0 |
| COLUMN 3 | 0 | 0 | 0 | 0 | 0 | 1 | 0 | 0 |
| COLUMN 4 | 1 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 1 |
| COLUMN 7 | 0 | 0 | 0 | 1 | 0 | 0 | 0 | 0 |
| COLUMN 8 | 0 | 0 | 0 | 0 | 0 | 0 | 1 | 0 |

Ddma

DOT ON/OFF STATE (DIGITIZED)

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 1 | 0 | 0 | 0 | 1 | 0 | 0 | 0 |
| COLUMN 2 | 0 | 0 | 0 | 0 | 0 | 0 | 0 | 0 |
| COLUMN 3 | 0 | 0 | 0 | 0 | 0 | 0 | 0 | 0 |
| COLUMN 4 | 0 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 0 |
| COLUMN 7 | 0 | 0 | 0 | 0 | 0 | 0 | 0 | 0 |
| COLUMN 8 | 0 | 0 | 0 | 0 | 0 | 0 | 0 | 0 |

Ddmg

Fig.25

|  | ROW 1 | ROW 2 | ROW 3 | ROW 4 | ROW 5 |
|---|---|---|---|---|---|
| COLUMN 1 | 0 | 1 | 2 | 1 | 0 |
| COLUMN 2 | 1 | 3 | 4 | 3 | 1 |
| COLUMN 3 | 2 | 4 | 5 | 4 | 2 |
| COLUMN 4 | 1 | 3 | 4 | 3 | 1 |
| COLUMN 5 | 0 | 1 | 2 | 1 | 0 |

Fig.26

EQUATION DEFINING RMS GRANULARITY $$\text{RMS GRANULARITY} = \sqrt{\frac{\Sigma (\text{DENSITY VALUE} - \text{AVERAGE DENSITY VALUE})^2}{\text{PIXEL COUNT}}}$$

FAST GENERATION OF DITHER MATRIX

BACKGROUND

1. Field of the Invention

This invention relates to technology for printing an image by forming dots on a print medium.

2. Description of the Related Art

As output devices for images created using a computer or images shot using a digital camera or the like, printing devices that print images by forming dots on a print medium are widely used. These printing devices perform gradation expression using a halftone process because there are few dot tone values that can be formed for the input tone values. As one halftone process, an ordered dither method using a dither matrix is widely used. The ordered dither method has a big effect on the image quality according to the dither matrix contents, so for example as disclosed in JP-A-7-177351, JP-A-7-81190, and JP-A-10-329381, an attempt was made to optimize the dither matrix using an analysis method of simulated annealing or genetic algorithm using an evaluation function taking into consideration the human visual sense. In this kind of optimization process, threshold values can be determined in sequence by selecting threshold values which has the highest tendency for dot formation to be On in the halftone process.

However, this method of determining the storage elements in the above mentioned sequence requires computational process for evaluation for each of undetermined storage elements, which leads to the huge amount of calculation.

SUMMARY

An advantage of some aspect of the present invention is to provide highly efficient computing process technology for generating a dither matrix.

According to an aspect of the invention, a dither matrix generating method is provided. This method generates a dither matrix for determining a status of dot formation on each of print pixels of a print image to be formed on a print medium in response to input image data. The method comprising: determining a targeted threshold value from among a plurality of threshold values, the targeted threshold value having a highest tendency for dot formation to be On among threshold values for which storage elements are to be determined; determining a storage element for the targeted threshold value from among a plurality of candidate storage elements based on a matrix evaluation value, the matrix evaluation value representing a correlation with a prescribed objective state, the matrix evaluation value being calculated respectively on a presupposition of hypothetical dot On/Off states, the hypothetical dot On/Off states resulting from the targeted threshold value being stored in each of the plurality of candidate storage elements that are candidates for storing the targeted threshold value; and repeating the determining the targeted threshold value and the determining the storage element for at least part of the plurality of threshold values. The determining the storage element includes: extracting an element block that constitutes a group of the storage elements, the element block making up a part of the dither matrix; and selecting the candidate storage elements in succession from among the plurality of storage elements that make up the extracted element block.

In accordance with the method for generating a dither matrix of the invention, selection is carried out in two stages, namely, first selection involving extraction of a element block, and second selection involving selection of a candidate storage element from the extracted element block, whereby elements contained in element blocks that were not extracted during first stage selection will be automatically excluded from being targeted for selection. Meanwhile, since attaining good dot dispersion in optimization of a dither matrix requires that threshold values with successive values be distributed evenly throughout the entire dither matrix, it is extremely unlikely that element blocks not selected during first stage selection will contain optimal elements.

By carrying out selection in multiple stages in this way in accordance with the invention, elements that are extremely unlikely to include optimal candidate storage elements are excluded from the optimal candidate storage elements, whereby the number of iterations of processes such as the candidate storage element selection process and evaluation value calculation process can be minimized, and computing processes can be made efficient. The effects of such efficient computing processes are particularly notable in areas with low threshold values for dot density, i.e. areas with large numbers of candidate storage elements (e.g. tone areas with dot density of less than 1%).

Selection is not limited to two stages, and could instead be carried out in three more stages. For example, in the divided state depicted in FIG. 11, it would be acceptable, by way of the first selection, to select the element block EB1 from among the four divided blocks; by way of the second selection, to select any of four element blocks contained in the element block EB1; and by way of the third selection, to select a candidate storage element from the element block selected from the element block EB1. Examples of methods for "extracting an element block" include a method of selecting any of a plurality of the element blocks that make up the dither matrix (FIG. 11), a method of shifting element blocks as shown in Modification Example C-1 and FIG. 16; or a method involving selection at random.

The dither matrix of the invention is a broad concept that includes a conversion table (or correspondence table) used to generate a dither matrix in technology such as that disclosed, for example, in Japanese Unexamined Patent Application 2005-236768 and Japanese Unexamined Patent Application 2005-269527, which teach the use of intermediate data (count data) for the purpose of identifying dot on-off state. Such conversion tables may be generated not only directly from dither matrices generated by the generation method of the invention, but in some instances may be subject to adjustments or improvements; such instances will also constitute use of a dither matrix generated by the generation method of the invention.

Note that the invention can be realized with various aspects including a printing device, a dither matrix, a dither matrix generating device, a printing device or printing method using a dither matrix, or a printed matter generating method, or can be realized with various aspects such as a computer program for realizing the functions of these methods or devices on a computer, a recording medium on which that computer program is recorded, data signals containing that computer program and embodied within a carrier wave, and the like.

Also, for use of the dither matrix for the printing device, printing method, or printed matter generating method, by comparing the threshold value set in the dither matrix with the image data tone value for each pixel, a decision is made of whether or not dots are formed for each pixel, but, for example, it is also possible to make a decision on whether or not dots are formed by comparing the sum of the threshold value and the tone value with a fixed value. Furthermore, it is also possible to make a decision on whether or not dots are formed according to data generated in advance based on the threshold value and on the tone value without directly using the threshold value. The dither method of the invention generally is acceptable as long as the judgment of whether or not to form dots is made according to the tone value of each pixel and on the threshold value set in the pixel position corresponding to the dither matrix.

BRIEF DESCRIPTION OF THE DRAWINGS

FIG. 9 shows illustration depicting dots formed on each of eight pixels corresponding to elements in a dither matrix M, that store threshold values associated with the first to eighth highest tendency to dot formation.

FIG. 10 shows illustrations depicting a dither matrix M divided into four element blocks EB1-EB4 in Embodiment 1 of the invention.

FIG. 12 shows an illustration depicting selection of a candidate storage element from within an element block in Embodiment 1 of the invention.

FIG. 13 is an illustration depicting a dot density matrix that represents dot density in quantitative terms.

FIG. 18 shows an illustration of a dither matrix M subjected to the grouping process of Embodiment 2 of the invention.

FIG. 19 shows an illustration of four divided matrices M0-M3 in Embodiment 2 of the invention.

FIG. 22 shows an illustration depicting a dot density matrix Ddma containing digitized values of the On/Off states of dots formed on pixels corresponding to elements of the dither matrix M, and a dot density matrix Ddmg containing digitized values of the On/Off states of dots formed on pixels corresponding to elements of the divided matrix M0 only.

FIG. 25 shows an illustration depicting a low pass filter used in computing RMS granularity, employed in the Modification Example.

FIG. 26 shows an illustration depicting an equation defining RMS granularity, employed in the Modification Example.

DESCRIPTION OF THE PREFERRED EMBODIMENT

In order to provide a clearer understanding of the operation and effects of the invention, the preferred embodiment of the invention shall be described hereinbelow, in the following order.

A. Dither Matrix Optimization in the Embodiment of the Invention:

A-1. Optimization with Respect to Image Observation System (Visual System):

A-2. Optimization with Respect to Image Output System (Printing Method):

B. Method of Generating Dither Matrix in the Embodiment of the Invention:

B-1. Optimization with Respect to Image Observation System:

B-2. Optimization with Respect to Image Output System:

C. Modification Examples

A. DITHER MATRIX OPTIMIZATION IN THE EMBODIMENT OF THE INVENTION

Figure 1:
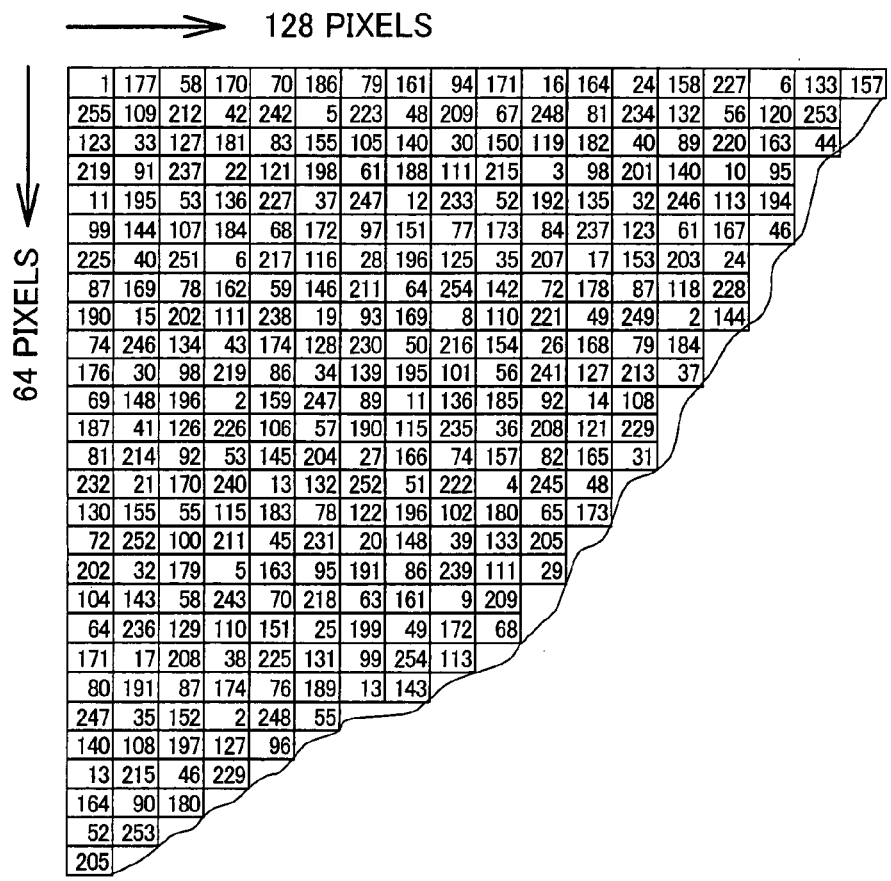
FIG. 1 shows an exemplary conceptual illustration of part of a dither matrix.

FIG. 1 shows an exemplary conceptual illustration of part of a dither matrix. In the illustrated matrix, threshold values selected uniformly from a tone value range of 1-255 are stored in a total of 8192 elements, i.e. 128 elements in the lateral direction (main scanning direction) by 64 elements in the vertical direction (sub-scanning direction). The size of the dither matrix is not limited to that shown by way of example in FIG. 1, and it is possible to have various sizes, including a matrix with an equal number of storage elements in both the vertical and lateral directions.

Figure 2:
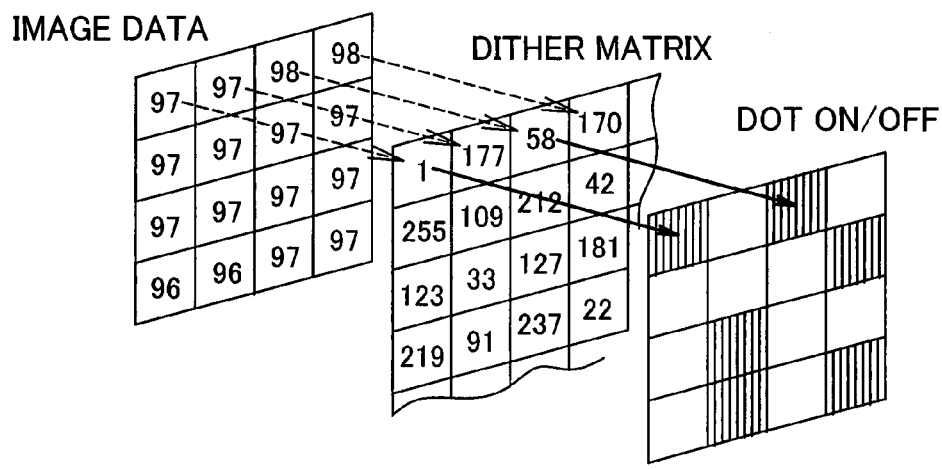
FIG. 2 shows an illustration depicting the concept of dot on-off state using a dither matrix.

FIG. 2 shows an illustration depicting the concept of dot on-off state using a dither matrix. For convenience, only some of the elements are shown. As depicted in FIG. 2, when determining dot on-off states, tone values from the image data are compared with threshold values saved at corresponding locations in the dither matrix. In the event that a tone value from the image data is greater than the corresponding threshold value stored in the dither table, a dot is formed; whereas if the tone value from the image data is smaller, no dot is formed. Pixels shown with hatching in FIG. 2 signify pixels on which dots are formed. By using a dither matrix in this way, the dot on-off state can be determined on a pixel-by-pixel basis, by a simple process of comparing the tone values of the image data with the threshold values established in the dither matrix, making it possible to carry out the tone number conversion process rapidly. Furthermore, as will be apparent from the fact that once the tone values of the image data have been determined the decision as to whether to form dots on pixels will be made exclusively on the basis of the threshold values established in the matrix, and thus with a systematic dither process, it will be possible to actively control dot production conditions by means of the threshold value storage locations established in the dither matrix.

Since with a systematic dither process it is possible in this way to actively control dot production conditions by means of the threshold value storage locations established in the dither matrix, a resultant feature is that dot dispersion and other picture qualities can be controlled by means of adjusting setting of the threshold value storage locations. This means that by means of a dither matrix optimization process it is possible to optimize the halftoning process with respect to a wide variety of target states.

Figure 3:
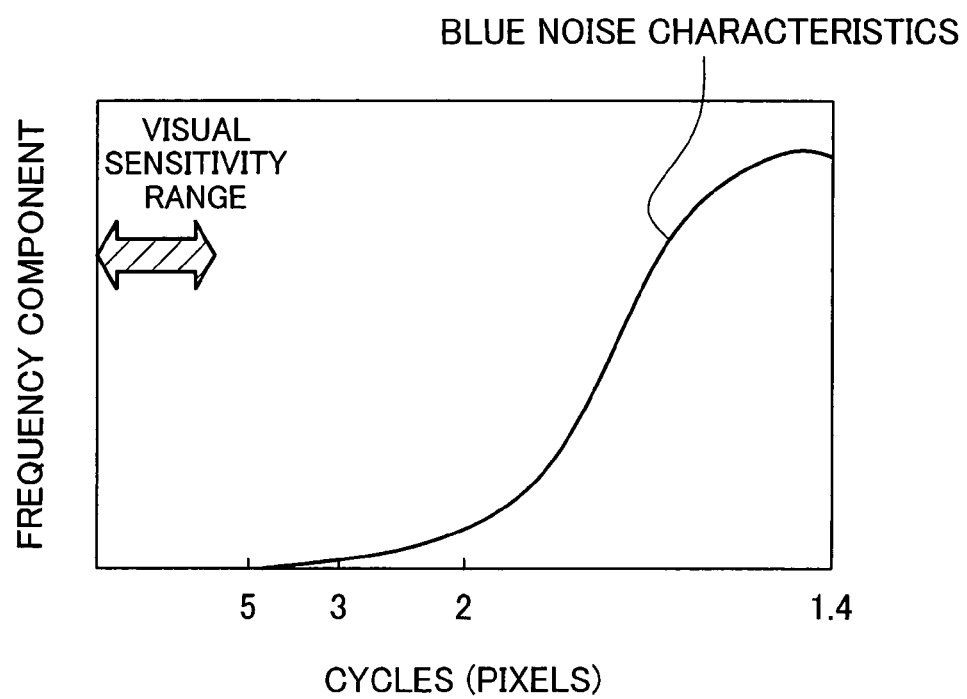
FIG. 3 shows an exemplary conceptual illustration of spatial frequency characteristics of threshold values established at pixels of a blue noise dither matrix having blue noise characteristics.

A-1. Optimization with Respect to Image Observation System (Visual System):

FIG. 3 shows an exemplary conceptual illustration of spatial frequency characteristics of threshold values established at pixels of a blue noise dither matrix having blue noise characteristics, by way of a simple example of dither matrix adjustment. The spatial frequency characteristics of a blue noise dither matrix are characteristics such that the length of one cycle has the largest frequency component in a high frequency region of 2 pixels or less. These spatial frequency characteristics have been established in consideration human perceptual characteristics. Specifically, a blue noise dither matrix is a dither matrix that, in consideration of the fact that human visual acuity is low in the high frequency region, has the storage locations of threshold values adjusted in such a way that the largest frequency component is produced in the high frequency region.

Figures 4A, 4B, 4C:
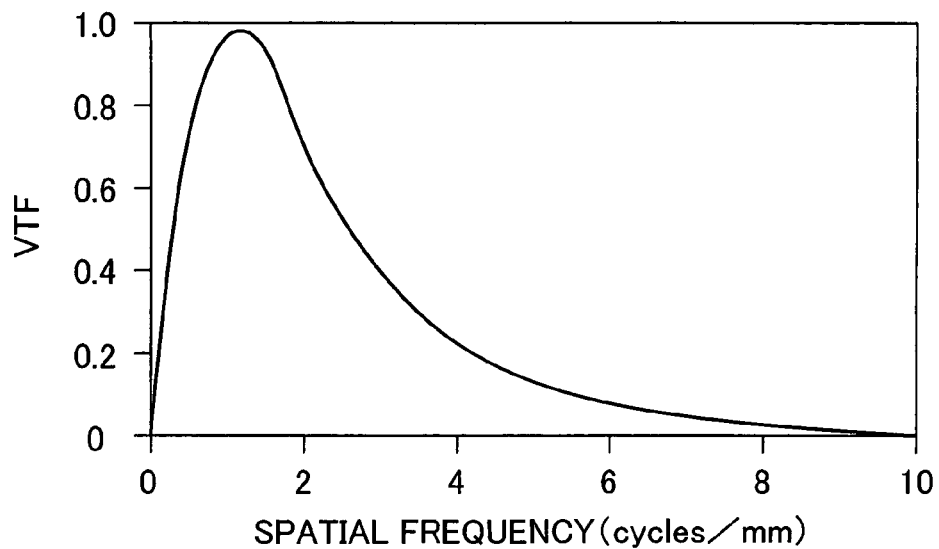
FIGS. 4A to 4C show conceptual illustrations of a visual spatial frequency characteristics VTF (Visual Transfer Function) representing human visual sensitivity with respect to spatial frequency.

FIGS. 4A to 4C show a conceptual illustration of a visual spatial frequency characteristics VTF (Visual Transfer Function) representing human visual acuity with respect to spatial frequency. Where a visual spatial frequency characteristics VTF is used, it is possible to quantify the perception of graininess of dots which will be apparent to the human visual faculty following a halftoning process, by means of modeling human visual acuity using a transfer function known as a visual spatial frequency characteristics VTF. A value quantified in this manner is referred to as a graininess index. FIG. 4B gives a typical experimental equation representing a visual spatial frequency characteristics VTF. In FIG. 4B the variable L represents observation distance, and the variable u represents spatial frequency. FIG. 4C gives an equation defining a graininess index. In FIG. 4C the coefficient K is a coefficient for matching derived values with human acuity.

Such quantification of graininess perception of the human visual faculty makes possible finely-tuned optimization of a dither matrix for the human visual system. Specifically, a Fourier transformation can be performed on a hypothetical matrix derived when input tone values have been input to a dither matrix, to arrive at a power spectrum FS, and a graininess evaluation value that can be derived by integrating all input tone values after a filter process involving multiplying the visual spatial frequency characteristics VTF with this power spectrum FS (FIG. 4C) can be utilized as a dither matrix evaluation coefficient. In this example, the aim is to achieve optimization where threshold value storage locations are adjusted so as to minimize the dither matrix evaluation coefficient.

As an example of an evaluation value of this type, an evaluation value called the GS value (Graininess scale) has been proposed. (Citation: Fine Imaging and Hardcopy, Corona, a co-publication of the editors of the Society of Photographic Science and Technology, Japan/The Imaging Society of Japan, p. 534). However, this model of the human visual system is not complete; as pointed out in Patent Citation 1 (Japanese Unexamined Patent Application 7-177351), graininess perception can vary depending on visual distance and other visual field parameters.

However, with this sort of nonlinear optimization, repeated trial and error is unavoidable in the optimization process, and considering the degree of freedom possible for threshold value storage location in a dither matrix containing, for example, threshold values of a tone value range of 1-255 at a total of 8192, it will be apparent that the number of repeated calculations required will be enormous.

In this way, while dither matrix optimization has the feature that it is possible to actively control the condition of dot production by means of the established threshold value storage locations, the enormous volume of optimization computations required makes it very impractical.

Figure 5:
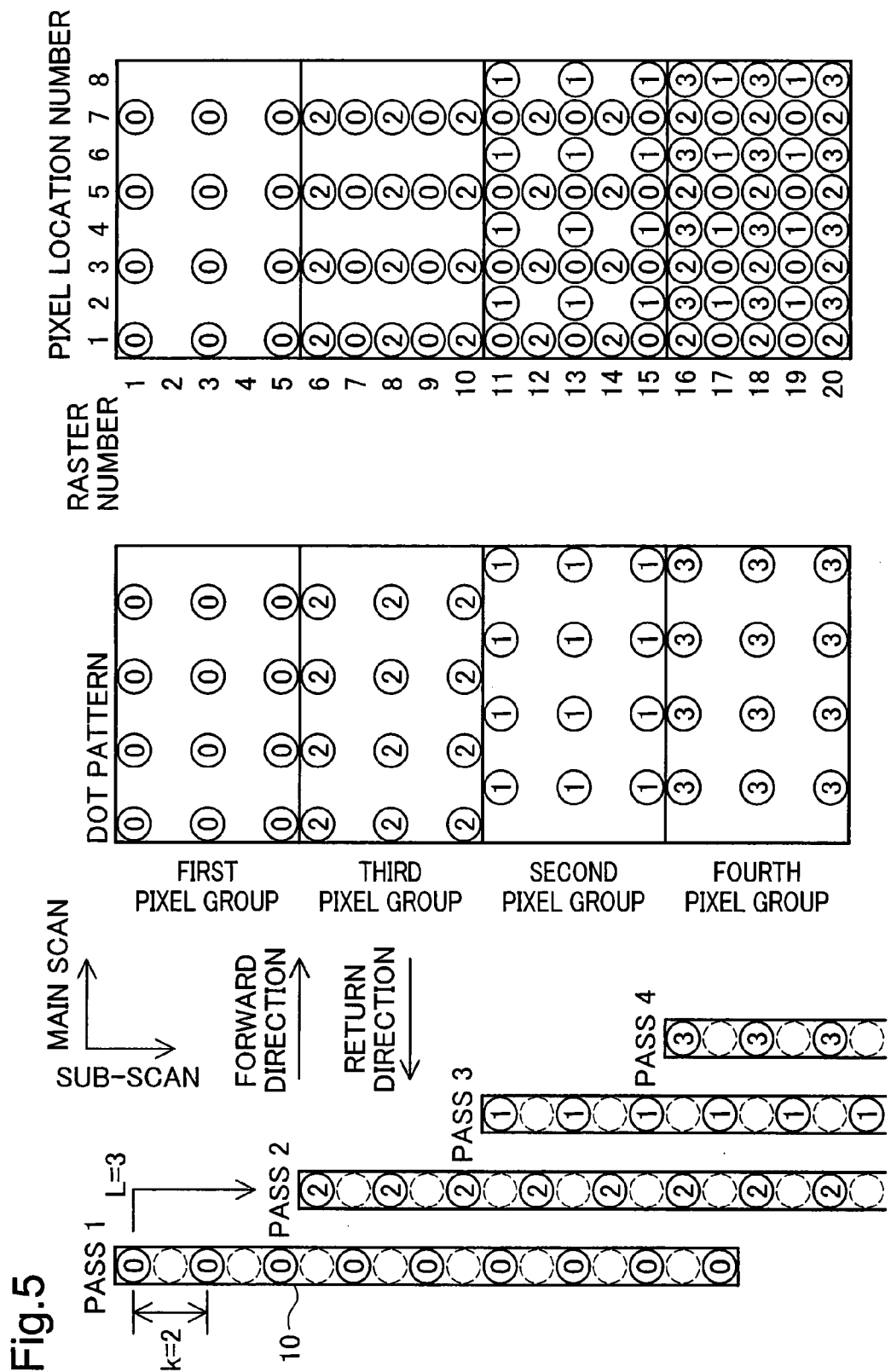
FIG. 5 shows an illustration depicting an exemplary method of generating an image for printing, targeted for dither matrix optimization in the embodiment of the invention.
Figure 6:
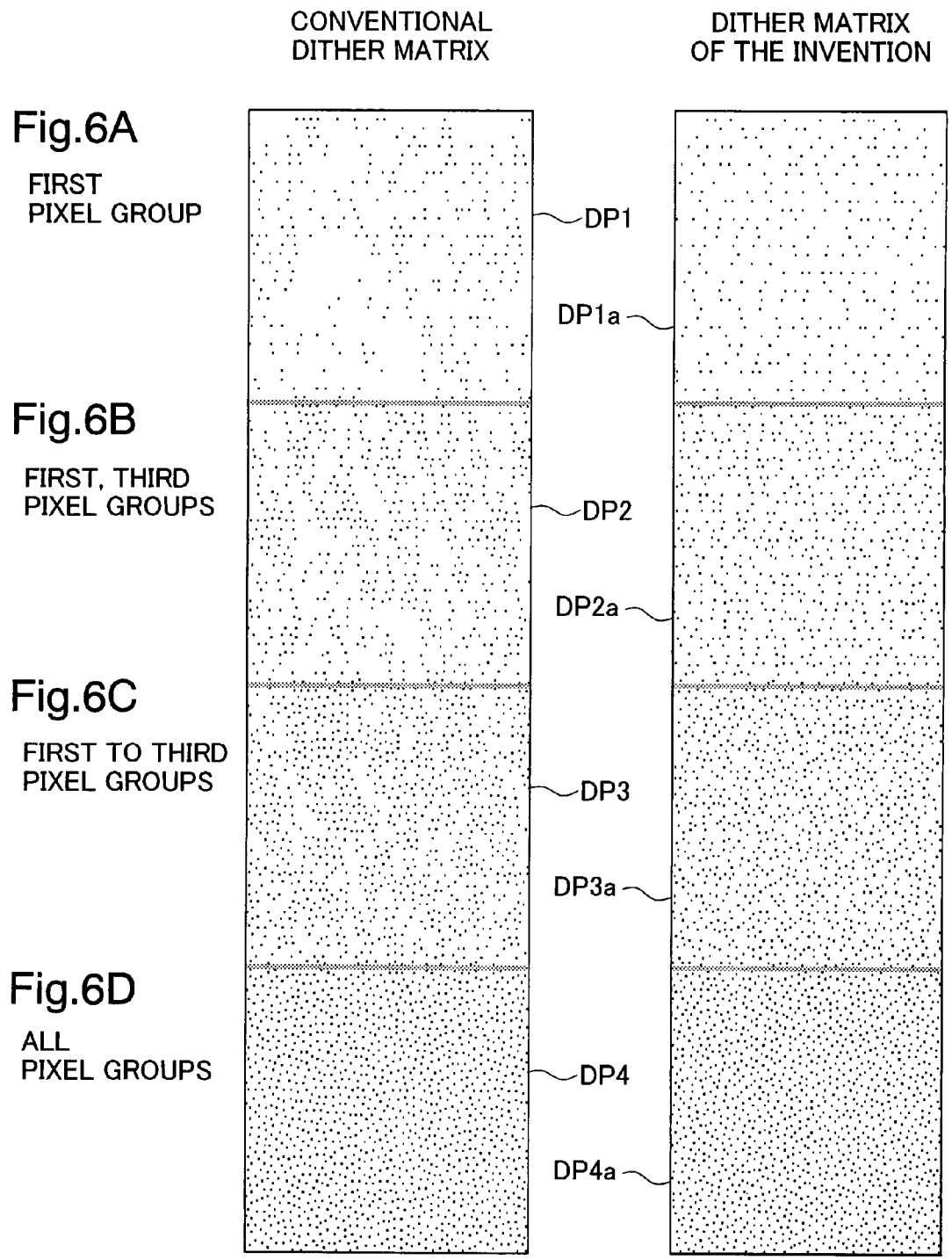
FIGS. 6A to 6D show illustrations depicting printing pixels belonging to each of a plurality of pixel groups, combined with one another in a common printing area to generate a print image on a printing medium in the embodiment of the invention.

A-2. Optimization with Respect to Image Output System (Printing Method):

FIG. 5 is an illustration depicting an exemplary method of generating an image for printing, targeted for dither matrix optimization in the embodiment of the invention. The inventors have made the novel discovery that that dither matrix optimization problem is effective not only for optimization with respect to the human visual system, but also for optimization with respect to image forming methods.

The print image is generated on the print medium by forming ink dots while performing main scanning and sub scanning in this image forming methods. The main scan means the operation of moving the printing head 10 relatively in the main scan direction in relation to the print medium. The sub scan means the operation of moving the printing head 10 relatively in the sub scan direction in relation to the print medium. The printing head 10 is configured so as to form ink dots by spraying ink drops on the print medium. The printing head 10 is equipped with ten nozzles that are not illustrated at intervals of 2 times the pixel pitch k.

Generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scan direction. Each circle indicates the dot forming position. The number inside each circle indicates the pixel groups configured from the plurality of pixels for which ink dots are formed simultaneously. With pass 1, dots are formed on the print pixels belong to the first pixel group.

When the pass 1 main scan is completed, the sub scan sending is performed at a movement volume L of 3 times the pixel pitch in the sub scan direction. Typically, the sub scan sending is performed by moving the print medium, but with this embodiment, the printing head 10 is moved in the sub scan direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the second pixel group. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the third and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 8. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the second pixel group. With pass 3, at the focus area, dots are formed at the pixels belonging to the third pixel group. With pass 4, at the focus area, dots are formed at the pixels belonging to the fourth pixel group.

In this way, with this embodiment, we can see that the dots formed at the print pixels belonging to each of the plurality of first to fourth pixel groups are formed by mutually combining at the common print area.

FIGS. 6A to 6D show explanatory drawings of the state of generating a print image on a print medium by mutually combining on a common print area the dots formed on the print pixels belonging to each of the plurality of pixel groups for the first embodiment of the invention. With the example of FIG. 2, the print image is the print image of a specified medium gradation (single color). The dot patterns DP1 and DP1a indicate dot patterns formed at a plurality of pixels belonging to the first image group. The dot patterns DP2 and DP2a indicate dot patterns formed on the plurality of pixels belonging to the first and third pixel groups. The dot patterns DP3 and DP3a indicate dot patterns formed on the plurality of pixels belonging to the first to third pixel groups. The dot patterns DP4 and DP4a indicate dot patterns formed on the plurality of pixels belonging to all the pixel groups.

The dot patterns DP1, DP2, DP3, and DP4 are dot patterns when using the dither matrix of the prior art. The dot patterns DP1a, DP2a, DP3a, and DP4a are dot patterns when using the dither matrix of the invention of this application. As can be understood from FIGS. 6A to 6D, when using the dither matrix of the invention of this application, especially with the dot patterns DP1a and DP2a for which there is little dot pattern overlap, the dot dispersibility is more uniform than when using the dither matrix of the prior art.

With the dither matrix of the prior art, optimization is performed focusing only on the dot dispersibility for the finally formed print image (with the example in FIGS. 6A to 6D, dot pattern DP4) because there is no concept of a pixel group. To say this another way, because the dispersibility of dots formed on the pixels belonging to each pixel group is not considered, the dispersibility of dots formed on the pixels belonging to each pixel group is poor, and dot density sparseness occurs.

The dither matrix optimized with respect to image output system, in addition to the dispersibility of the dots for the print image, also considers up to the dispersibility of the dots formed on the pixels belonging to each pixel group, so the dispersibility of the dots formed on the pixels belonging to each pixel group and the dispersibility of dots for the print image are both improved.

The dither matrix of the invention of this application attempts to optimize not only the finally formed dot patterns, but also focuses on dot patterns with the dot forming process. This kind of focus point did not exist in the past. This is because in the past, the technical basic assumption was that even if the dot pattern dispersion was poor with the dot forming process, the image quality was good if the dispersibility of the dot patterns formed at the end were good.

However, the inventors of this application went ahead and performed an analysis of the image quality of print images focusing on the dot patterns with the dot forming process. As a result of this analysis, it was found that image unevenness occurs due to dot pattern sparseness with the dot forming process. This image unevenness was ascertained by the inventors of this application to be strongly perceived by the human eye as ink physical phenomena such as ink agglomeration unevenness, glossiness, or the bronzing phenomenon. Note that the bronzing phenomenon is a phenomenon by which the status of the light reflected by the printing paper surface is changed, such as the printing surface exhibiting a color of a bronze color or the like due to ink drop pigment agglomeration or the like.

For example, the ink agglomeration or bronzing phenomenon can occur even in cases when a print image is formed with one pass. However, even when ink agglomeration or the like occurs uniformly on the entire surface of the print image, it is difficult to be seen by the human eye. This is because since it occurs uniformly, ink agglomeration or the like does not occur as non-uniform "unevenness" including low frequency components.

However, when unevenness occurs with low frequency areas which are easily recognized by the human eye with ink agglomeration or the like for dot patterns formed in pixel groups for which ink dots are formed almost simultaneously with the same main scan, this is manifested as a strong image quality degradation. In this way, when forming print images using ink dot formation, it was first found by the inventors that optimization of the dither matrix focusing also on dot patterns formed in pixel groups for which ink dots are formed almost simultaneously is linked to higher image quality.

In addition, with the dither matrix of the prior art, optimization was attempted with the prerequisite that the mutual positional relationship of each pixel group is as presupposed, so optimality is not guaranteed when the mutual positional relationship is skewed, and this was a cause of marked degradation of the image quality. However, dot dispersibility is ensured even with dot patterns for each pixel group for which mutual positional relationship skew is assumed, so it was first confirmed by experiments of the inventors of the invention of this application that it is possible to also ensure a high robustness level in relation to mutual positional relationship skew.

Furthermore, for the technical concept of the invention of this application, it was also ascertained by the inventors that the importance increases as the printing speed accelerates. This is because acceleration of the printing speed is connected to the formation of dots in the next pixel group during the time that sufficient time has not been taken for ink absorption.

In this way, the inventors developed a novel dither matrix optimization method, taking note of the dot formation process, and the configuration of the printing device, namely, the printing process. However, such an optimization problem created the need to speed up dither matrix evaluation computations and dramatically reduce the computing process load. This is because the dot formation process, and the configuration of the printing device, namely, the printing process, have many parameters and variations, so that the amount of computations required for optimization is huge. As shall be discussed hereinbelow, the invention makes it possible to dramatically reduce this huge amount of computations.

B. METHOD FOR OPTIMAL DITHER MATRIX GENERATION IN THE EMBODIMENTS OF THE INVENTION

In the embodiments of the invention, methods for generating an optimal dither matrix for an image observation system and an optimal dither matrix for an image forming device are implemented. Dither matrix optimization also can be carried out for optimization of some portion of input tone values (e.g. those in areas of low dot density only). Experiments conducted by the inventors have shown that the invention has notable effect particularly in determination of storage elements for threshold values that correspond to tone values with dot density of less than 1%.

Figure 7:
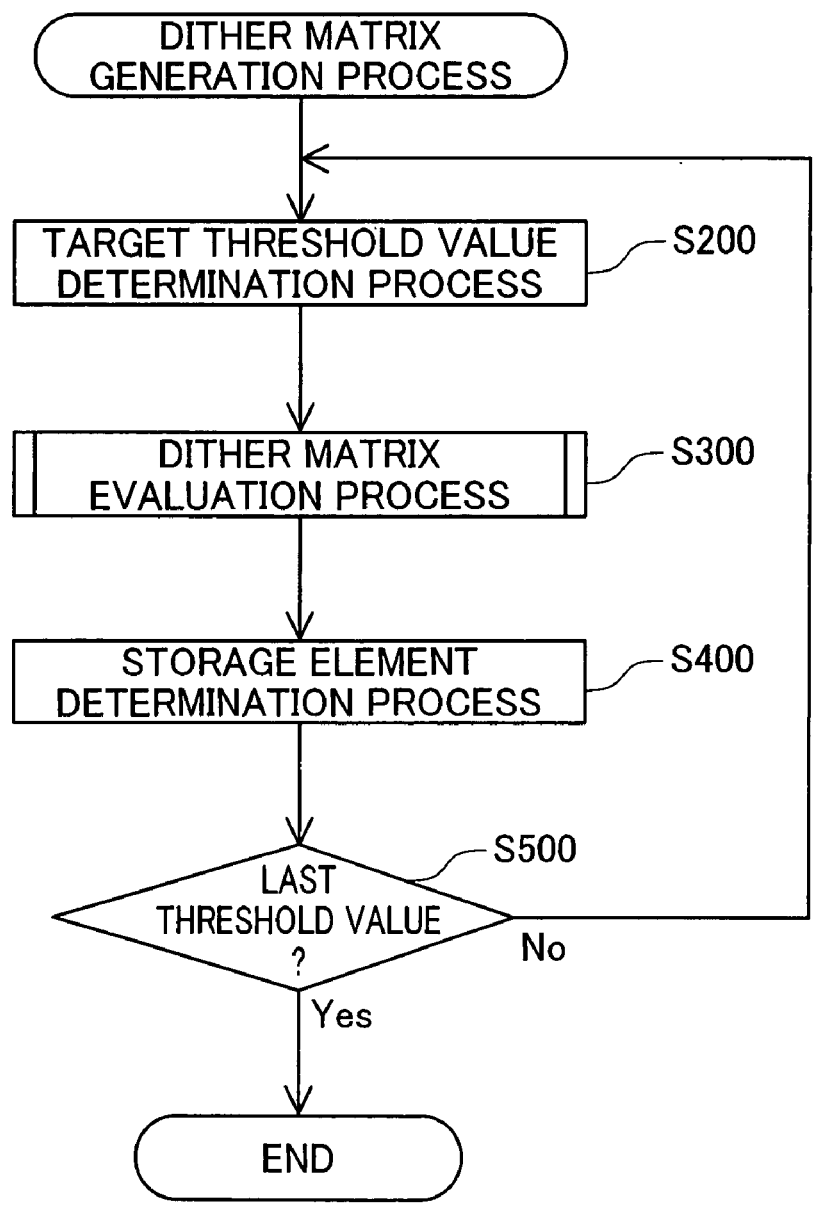
FIG. 7 shows a flowchart depicting the processing routine of the dither matrix generation method in Embodiment 1 of the invention.

B1. Optimization for an Image Observation System:

FIG. 7 is a flowchart depicting the processing routine of the dither matrix generation method in Embodiment 1 of the invention. In this example, to facilitate the description, it is assumed that a small 8×8 dither matrix is generated. It is also assumed that optimization is carried out using the graininess index (FIG. 4C) to evaluate the optimality of the dither matrix.

In Step S200, a target threshold value determination process is carried out. The target threshold value determination process is a process for determining a threshold value for which a storage element is to be determined. In the present embodiment, threshold values are determined through selection in sequence, starting from threshold values with relatively small values, i.e. threshold values having values associated with highest tendency to dot formation. In this way, by selecting threshold values in sequence starting from those associated with highest tendency to dot formation, elements for storing threshold values are fixed in sequence starting from those threshold values that control dot placement in highlight areas in which dot granularity tends to stand out, so that there is a large degree of freedom in design of highlight areas in which dot granularity tends to stand out.

In Step S300, a dither matrix evaluation process is carried out. The dither matrix evaluation process is a process for digitizing optimality of the dither matrix on the basis of a pre-established evaluation coefficient (in this example, the graininess index).

Figure 8:
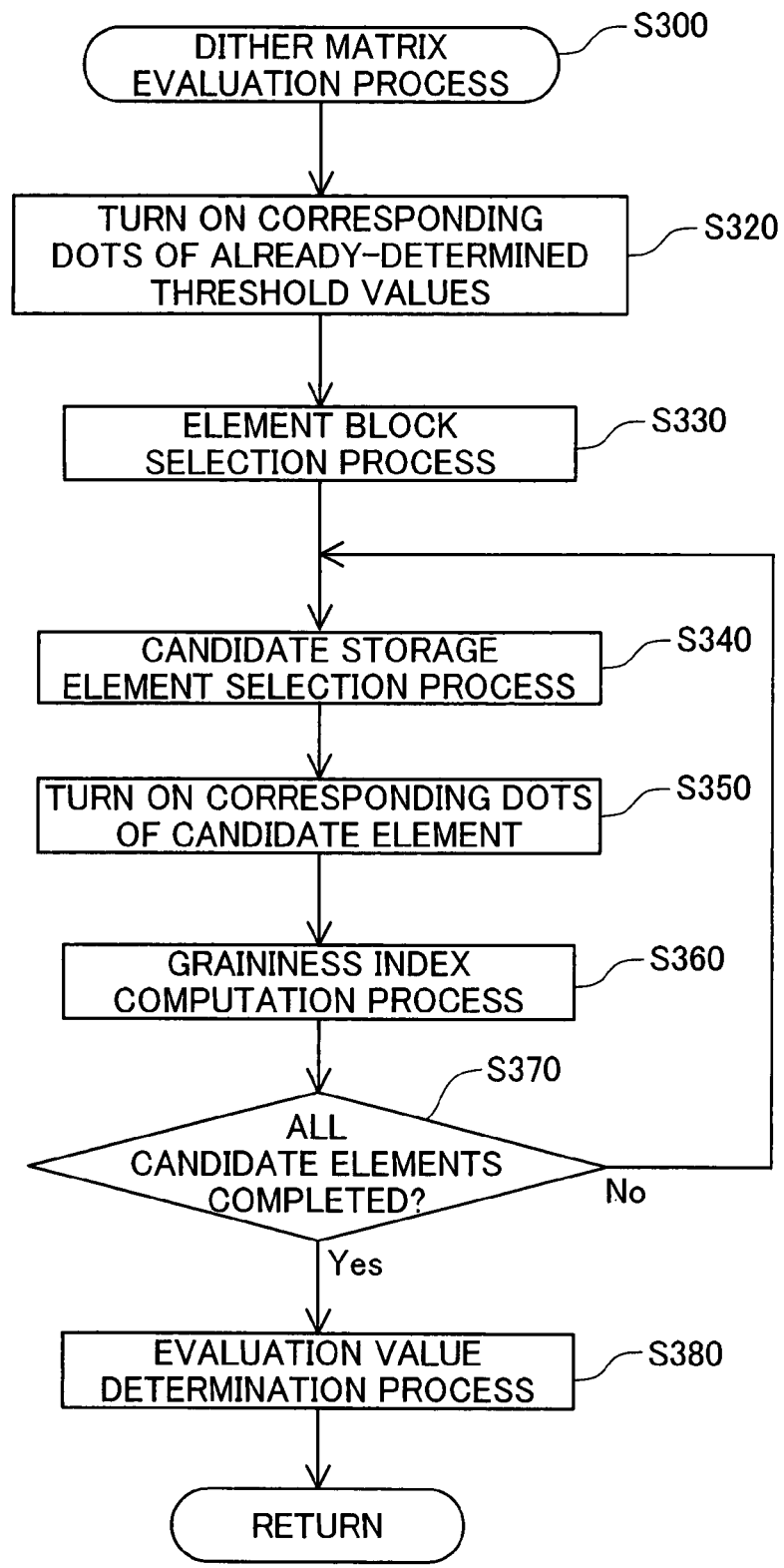
FIG. 8 shows a flowchart showing the processing routine of the dither matrix evaluation process in Embodiment 1 of the invention.

FIG. 8 is a flowchart showing the processing routine of the dither matrix evaluation process in Embodiment 1 of the invention. In Step S320, the corresponding dots of already-determined threshold values are turned On. An already-determined threshold value means a threshold value for which a storage element has already been determined. In the present embodiment, as mentioned earlier, since selection takes place in sequence starting from threshold values associated with highest tendency to dot formation, when a dot is formed on a targeted threshold value, dots will invariably have been formed on those pixels that correspond to elements storing already-determined threshold values. Conversely, at the smallest input tone value at which a dot will form on the targeted threshold value, dots will not have been formed on pixels corresponding to any elements other than elements storing already-determined threshold values.

FIG. 9 is an illustration depicting dots formed on each of eight pixels corresponding to elements in a dither matrix M, that store threshold values associated with the first to eighth highest tendency to dot formation. This dot pattern is used to determine the pixel on which the ninth dot should be formed. Specifically, it is used to determine the storage element for the targeted threshold value with the ninth highest tendency to dot formation. In the present embodiment, the storage elements are determined in such a way that the targeted threshold value is stored in an element corresponding to the pixel affording the lowest graininess index for a hypothetical dot on/off state that presupposes that a dot was formed.

In Step S330, an element block selection process is carried out. The element block selection process is a process for selecting any one of four element blocks EB1-EB4 that make up the dither matrix M.

FIG. 10 is an illustration depicting a dither matrix M divided into four element blocks EB1-EB4. The element block EB1 is composed of a group of eight storage elements arrayed in Columns 1-4 and Rows 1-4; element blocks EB2-EB4 are composed respectively of a group of eight storage elements arrayed in Columns 5-8 and Rows 1-4, a group of eight storage elements arrayed in Columns 1-4 and Rows 5-8, and a group of eight storage elements arrayed in Columns 5-8 and Rows 5-8. It is not always necessary for the element blocks to be square matrices having equal numbers of row elements and column elements; the number of row elements could be half the number of column elements, for example.

Figure 11:
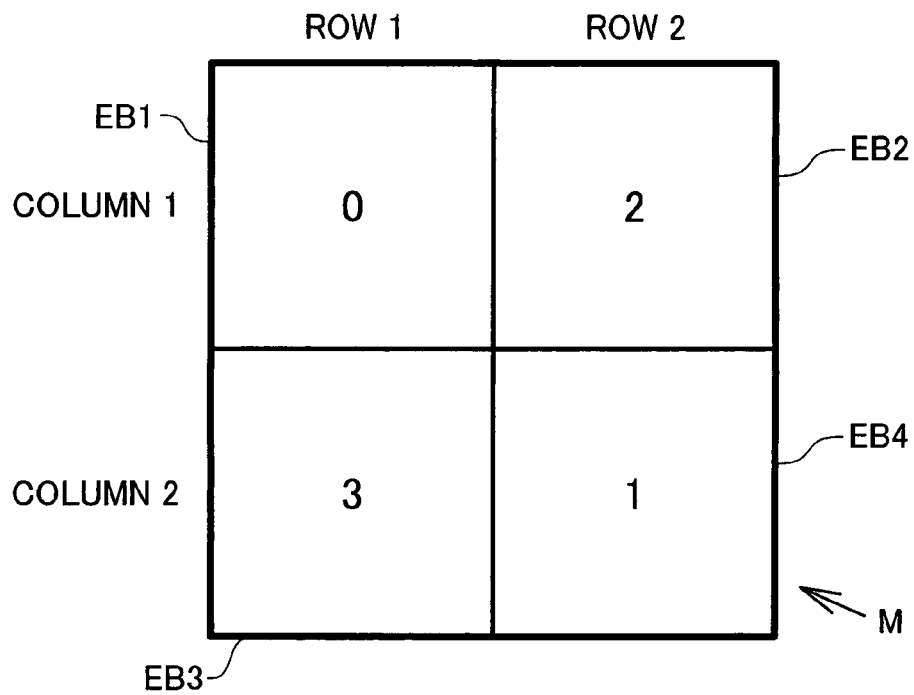
FIG. 11 shows an illustration depicting a selection sequence in the element block selection process in Embodiment 1 of the invention.

FIG. 11 is an illustration depicting a selection sequence in the element block selection process. In FIG. 11, the rows and the columns depict rows and columns of element blocks. For example, the element block EB1 is the element block of Row 1/Column 1. The numerical value in each element block indicates the Bayer selection sequence. For example, the element block EB1 of Row 1/Column 1 is selected initially; followed by sequential selection of the element block EB4 of Row 2/Column 2, the element block EB2 of Row 2/Column 1, and the element block EB3 of Row 2/Column 1; and finally returning to selection of the element block EB1 of Row 1/Column 1. The element blocks are selected repeatedly in this selection sequence.

In the present embodiment, an example of division into four element blocks EB1-EB4 is shown, but division into 16, as depicted by the dither matrix M' in FIG. 11 for example, would be acceptable as well. The numerical value in each element block in the dither matrix M' indicates the Bayer selection sequence; however the selection sequence is not limited to this, it being possible to instead select the element block with the lowest dot density after a low-pass filter process, for example.

In Step S40 (FIG. 8), a candidate storage element process is carried out. The candidate storage element process is a process for selecting, from among a selected element block, a candidate storage element for a threshold value.

FIG. 12 is an illustration depicting selection of a candidate storage element from within an element block. FIG. 12 depicts the group of storage elements contained within the element block EB1. In this example, the element with the "*" symbol has been selected as the candidate storage element. Selection of the candidate storage element may be accomplished, for example, by excluding the already-determined elements, namely the storage element of Row 2/Column 2 that has already been determined as the storage element of a threshold value (Step S320), and the already-determined storage element of Row 4/Column 1, and then selecting sequentially from among all of the remaining elements; or by selection from only storage elements not situated adjacently to already-determined elements. According to the latter selection method, only the four storage elements of Rows 1-4/Column 4 and the storage element of Row 4/Column 3 would be selected as candidate storage elements.

In Step S350 (FIG. 8), it presumed that the dot of the selected storage element is On. By so doing, it becomes possible to evaluate the dither matrix M when the threshold value associated with the ninth highest tendency to dot formation is stored in the candidate storage element.

FIG. 13 is an illustration depicting a matrix in which a dot On state of the pixel corresponding to the candidate storage element (Row 1/Column 1) is represented digitally, in addition to the dot On states of each of the eight pixels in FIG. 9, i.e. depicting a dot density matrix Ddm that represents dot density quantitatively. The number "0" denotes the dot Off state, while the number "1" denotes the dot On state.

In Step S360, a graininess index is computed on the basis of this dot density matrix (FIG. 13). The series of processes from the candidate storage element selection process (Step S340) to the graininess index computation process is carried out for all of the candidate storage elements Step S370).

In Step S370, a graininess index is computed for each candidate storage element, and the candidate storage element having the smallest graininess index is determined to be the optimal element (Step S400, FIG. 7).

This process is repeated, while changing threshold values, until the last threshold value is reached (Step S500). The last threshold value may be the maximum threshold value associated with the lowest tendency to dot formation, or a maximum threshold value within some prescribed range decided in advance. This applies to the threshold value targeted initially for evaluation as well.

In this way, in accordance with the present embodiment, during selection of candidate storage elements, selection takes place in two stages, namely, first selection whereby an element block is selected, and second selection whereby a candidate storage element is selected from the selected element block; thus, elements contained in element blocks that were not extracted during first stage selection are automatically excluded from being targeted for selection. Meanwhile, since attaining good dot dispersion in optimization of a dither matrix requires that threshold values with successive values be distributed evenly throughout the entire dither matrix, it is extremely unlikely that element blocks not selected during first stage selection will contain optimal elements.

In the present embodiment, through two-stage selection in this manner, it is possible for elements having extremely low probability of containing optimal candidate storage elements to be excluded from selection as candidate storage elements. It is accordingly possible to minimize the number of iterations of processes from the candidate storage element selection process (Step S340) to the graininess index computation process (Step S36), and make the computation processes efficient. The effects of such efficient computing processes are particularly notable in areas with low threshold values for dot density, i.e. areas with large numbers of candidate storage elements.

However, an exception to the above is that, in instances where the optimal element (i.e. the element having the smallest graininess index within an element block) is situated adjacently to the outer border of the element block to which it belongs, there is a high probability that an element with an even smaller graininess index will be present in another element block situated to the outside of the outer border of this first element block; therefore, in such instances, the optimality of the dither matrix can be enhanced in the manner to be described later in a Modification Example.

In the present embodiment, the graininess index corresponds to the "matrix evaluation value representing a correlation with a prescribed objective state" recited in the claims. The "prescribed objective state" meanwhile, refers in the present embodiment to a small graininess index of the dot On state.

Figure 14:
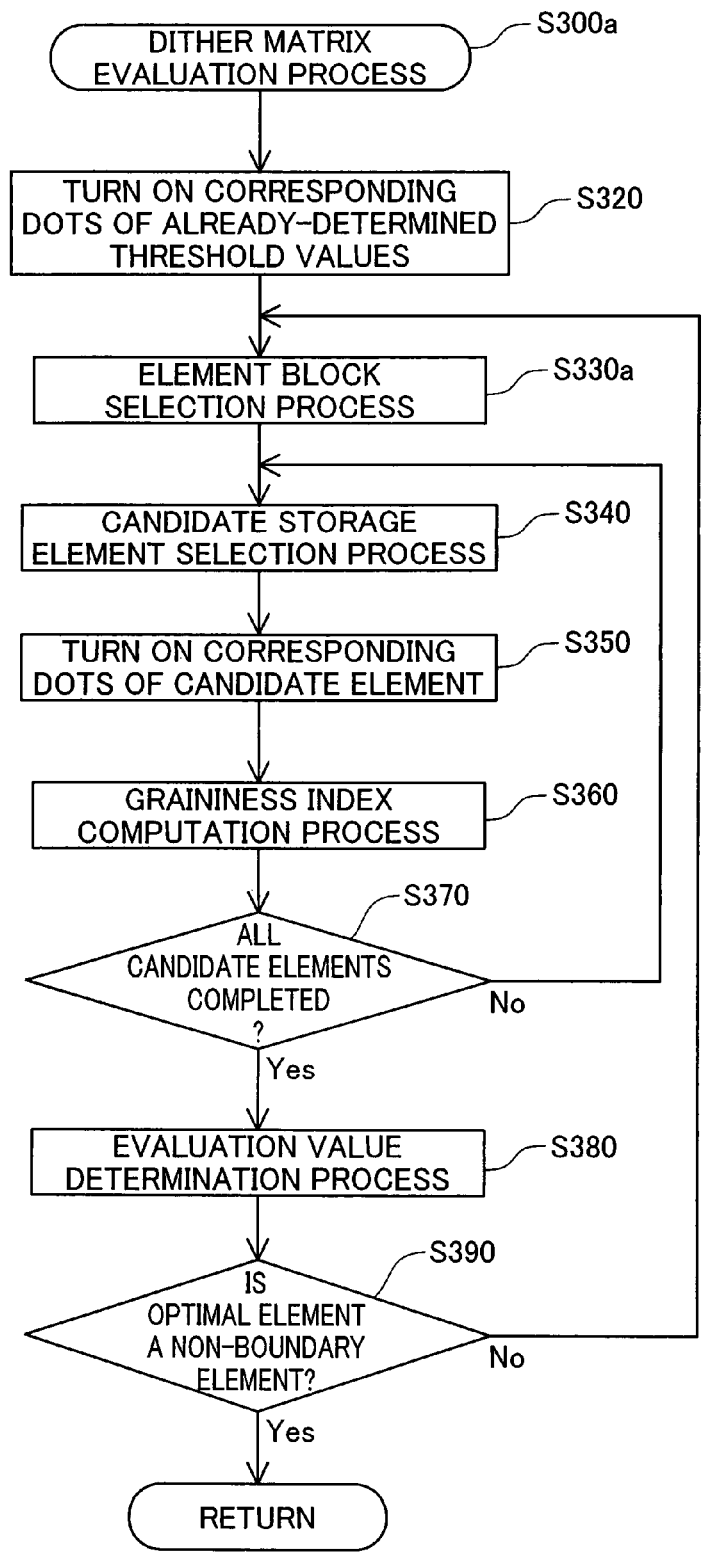
FIG. 14 shows a flowchart showing the processing routine of the dither matrix evaluation process in a Modification Example of Embodiment 1.

FIG. 14 is a flowchart showing the processing routine of the dither matrix evaluation process in a Modification Example of Embodiment 1. This Modification Example differs from Embodiment 1 in that a Step S390a is added to the process routing of dither matrix evaluation process (Step S300), and the element block selection process (Step S330) is changed to Step S330a.

In Step S390, a decision is made as to whether the optimal element determined within an element block is a non-boundary element. If on the basis of this decision it is determined that the element is a non-boundary element, the optimal element is designated as the storage element for the targeted threshold value; on the other hand, if it is determined that the optimal element is not a non-boundary element, i.e. that it is a boundary element, the process returns to the element block selection process (Step S330a). A non-boundary element means an element that is not situated adjacently to an outer border of the element block in the selected element block. In the example of FIG. 12, for example, these would be the four elements at Row 2/Column 2, Row 2/Column 3, Row 3/Column 2, and Row 3/Column 3.

In Step S330a, another element block is selected anew. The other element block is an element block situated adjacently across the boundary from the element block previously targeted for evaluation. Specifically, new selection is carried out as follows.

Figure 15:
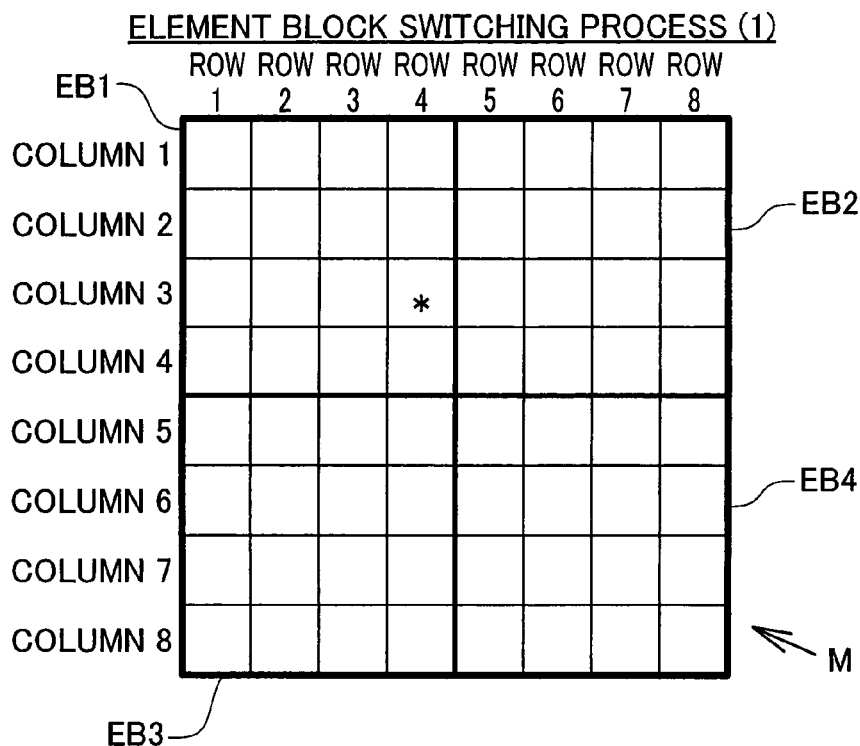
FIG. 15 shows an illustration depicting an exemplary element block switching process (1), i.e. selection of a new element block, in the Modification Example of Embodiment 1.

FIG. 15 is an illustration depicting an exemplary element block switching process (1), i.e. selection of a new element block. The example shown here is one where, in the element block switching process (1), the optimal element is the storage element of Row 3/Column 4 contained in the element block EB1, and the element block EB2 situated adjacently thereto across the boundary between Column 4 and Column 4 is newly selected. In the present embodiment, this boundary corresponds to the "outer border of the element block" recited in the claims.

Where it is presupposed that the dither matrix will be used continuously along the vertical, in the event that the optimal element in the element block EB1 is the storage element of Row 1/Column 3, the element block EB3 would be newly selected.

Figure 16:
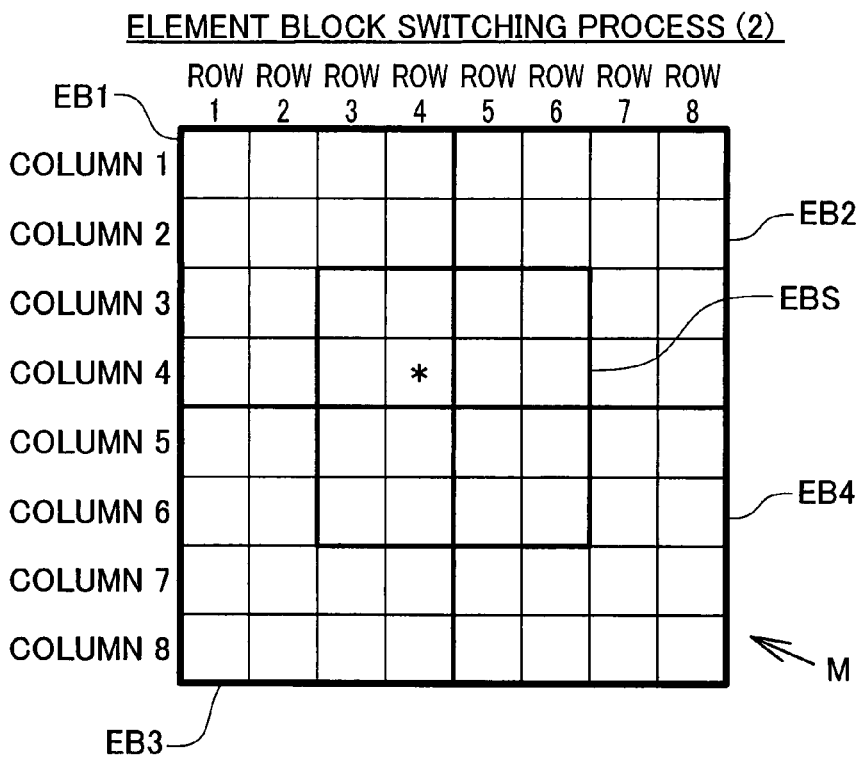
FIG. 16 shows an illustration depicting an exemplary element block switching process (2), i.e. shifting of the element block, in the Modification Example of Embodiment 1.

FIG. 16 is an illustration depicting an exemplary element block switching process (2), i.e. shifting of the element block. The example shown here is one where, in the element block switching process (2), the optimal element is the storage element of Row 4/Column 4 contained in the element block EB1, and the element block is now shifted to the element block EBS. This element block EBS is an element block that is shifted by the equivalent of two rows and two columns, with respect to the element block EB1.

The reason for establishing this new element block EBS is in consideration of the fact that a large number of element blocks, namely the three element blocks EB2-EB4, are situated adjacently to the storage element of Row 4/Column 4; and the fact that there is a high probability that the optimal storage element is located in proximity to the storage element of Row 4/Column 4. In the event that, in the element block EBS, the optimal element were found to be a boundary element of the element block EBS, the element block will be shifted again, and selection of either of the unprocessed element blocks EB2-EB3 will be carried out.

Where it is presupposed that the dither matrix will be used continuously along the horizontal and vertical, in the event that the optimal element in the element block EB1 is the storage element of Row 1/Column 1, the shift would be to the opposite side.

Figure 17:
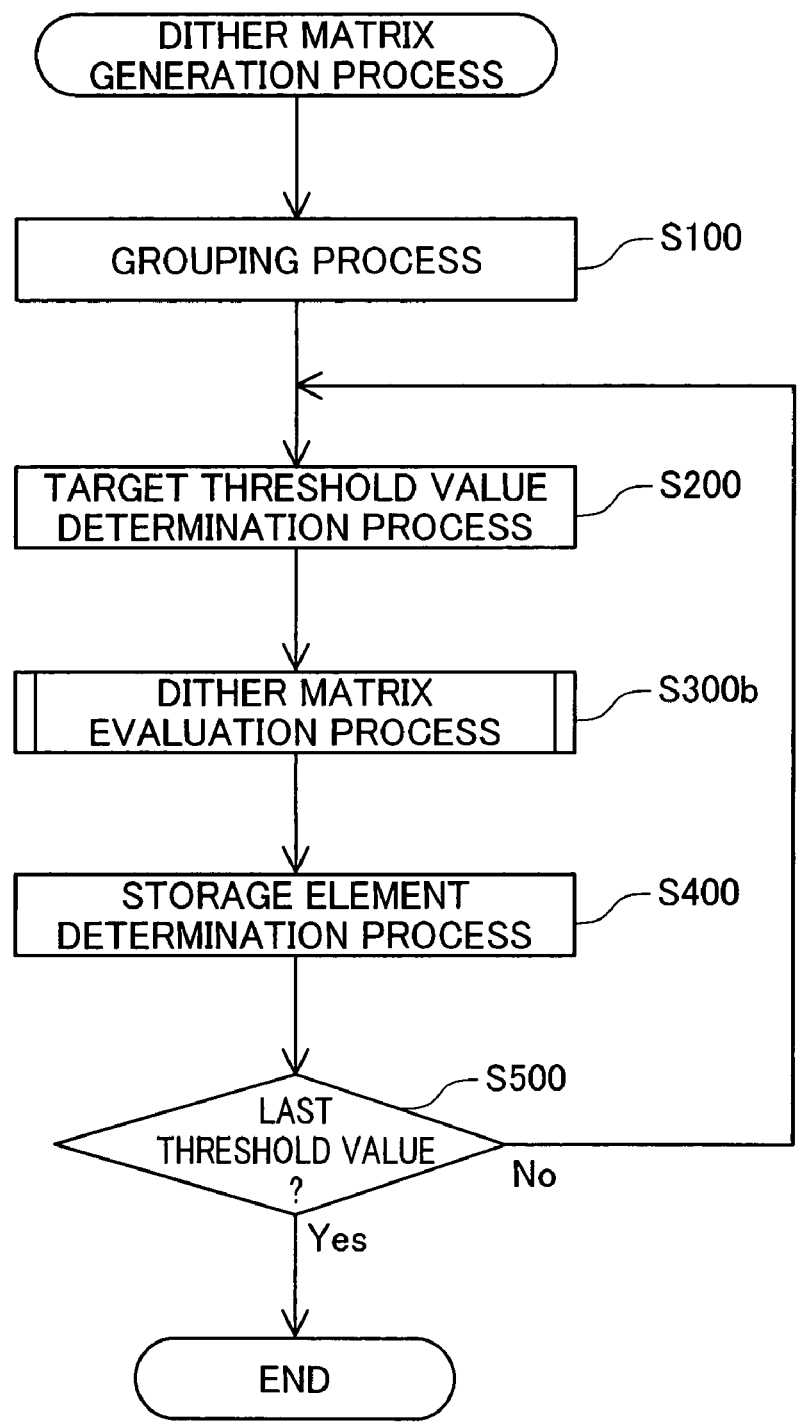
FIG. 17 shows a flowchart depicting the processing routine of the dither matrix generation method in Embodiment 2 of the invention.

B-2. Optimization for an Image Output System:

FIG. 17 is a flowchart depicting the processing routine of the dither matrix generation method in Embodiment 2 of the invention. This dither matrix generation method is designed so that optimization can be carried out in consideration of dispersion of dots that are formed substantially at the same time in the process of producing a printed image. For this purpose, a Step S100 has been added, and Step S300 has been modified to Step S300b.

In Step S100, a grouping process is carried out. In the present embodiment, the grouping process is a process for dividing a dither matrix into individual elements corresponding to a plurality of pixel groups in which dots are formed substantially at the same time in the process of producing a printed image.

FIG. 18 is an illustration of a dither matrix M subjected to the grouping process of Embodiment 2 of the invention. In this grouping process, the dither matrix is assumed to be divided into the four pixel groups shown in FIG. 5. The number appearing in each element of the dither matrix M indicates the pixel group to which the element belongs. For example, the element of Row 1/Column 1 belongs to the first pixel group (FIG. 5), while the element of Row 1/Column 2 belongs to the second pixel group.

FIG. 19 is an illustration of four divided matrices M0-M3 in Embodiment 2 of the invention. The divided matrix M0 is composed of a plurality of elements in the dither matrix M, which elements correspond to pixels that belong to a first pixel group, and a plurality of blank elements, which are elements that are blank. The blank elements are elements for which a dot will never be formed, regardless of input tone value. The divided matrices M0-M3 are composed respectively of a plurality of elements in the dither matrix M, which elements belong to the second to fourth pixel groups; and of blank elements.

In Step S300b, a dither matrix evaluation process is carried out in the same manner as in Embodiment 1, on the basis of the graininess index. In the present embodiment, however, the evaluation is carried out not just with consideration to the dither matrix M only, but with consideration to the four divided matrices M0-M3 as well.

Figure 20:
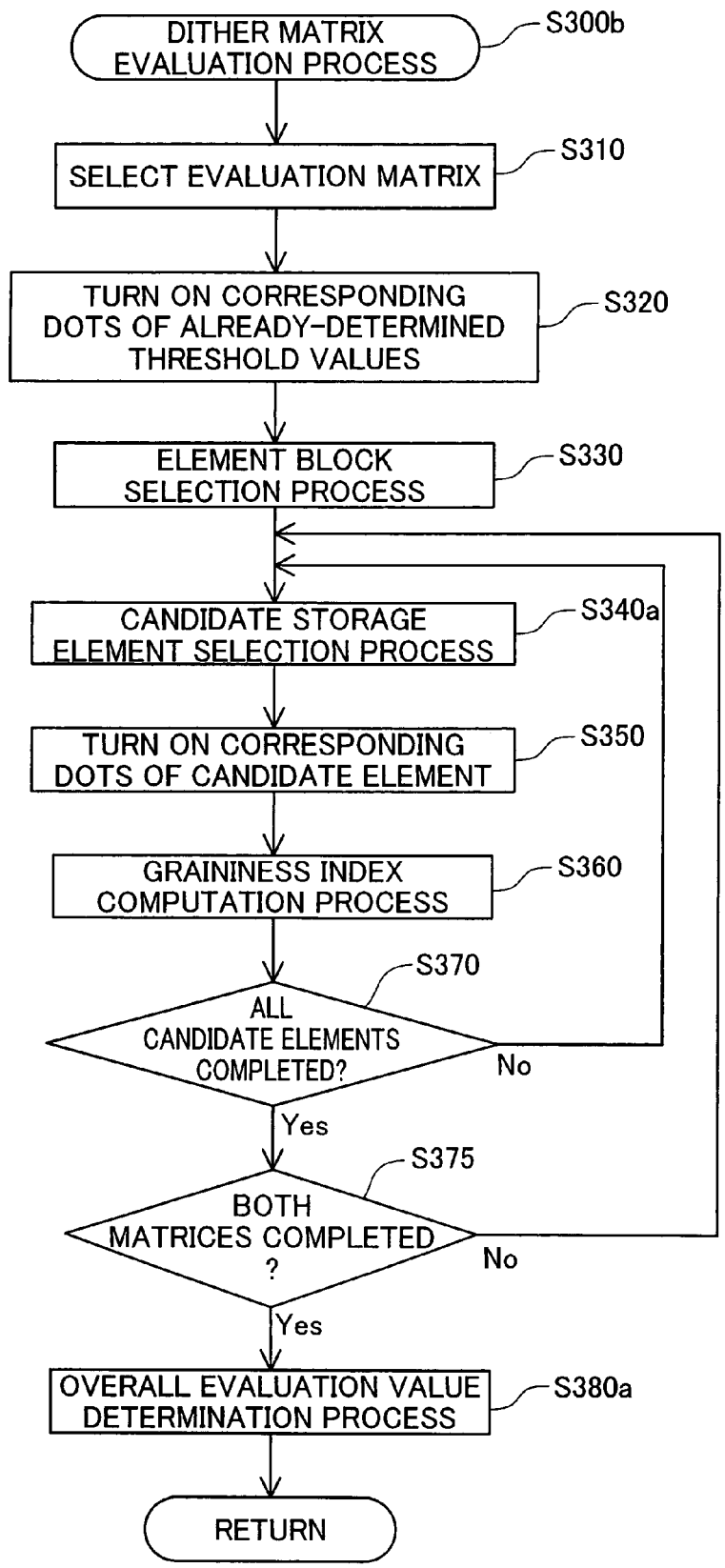
FIG. 20 shows a flowchart depicting the processing routine of the dither matrix evaluation process (Step S300b) in Embodiment 2 of the invention.

FIG. 20 is a flowchart depicting the processing routine of the dither matrix evaluation process (Step S300b) in Embodiment 2 of the invention. In the present embodiment, however, since evaluation is carried out with consideration to the four divided matrices M0-M3, Step S310 and Step S375 are added, and Step S340 and Step S380 are revised to Step S340a and Step S380a.

In Step S310, an evaluation matrix is selected. In the present embodiment, the evaluation matrix is a single matrix targeted for evaluation during determination of storage elements for the targeted threshold values in the four divided matrices M0-M3. In the present embodiment, evaluation is carried out while focusing on the evaluation matrix and the dither matrix M. However, an arrangement whereby evaluation is carried out while focusing on all five matrices would be acceptable as well.

In the present embodiment, the evaluation matrix is selected together with the targeted threshold value. Specifically, in the present embodiment, the divided evaluation matrices are selected sequentially by a method of selecting the divided matrix M0 by the first targeted threshold value, and selecting the divided matrix M1 by second targeted threshold value. The targeted threshold values are stored in any of the elements belonging to the evaluation matrix. In this example, a storage element for the ninth threshold value is being determined, so the element block EB1 and the divided matrix M0 are selected.

Figure 21:
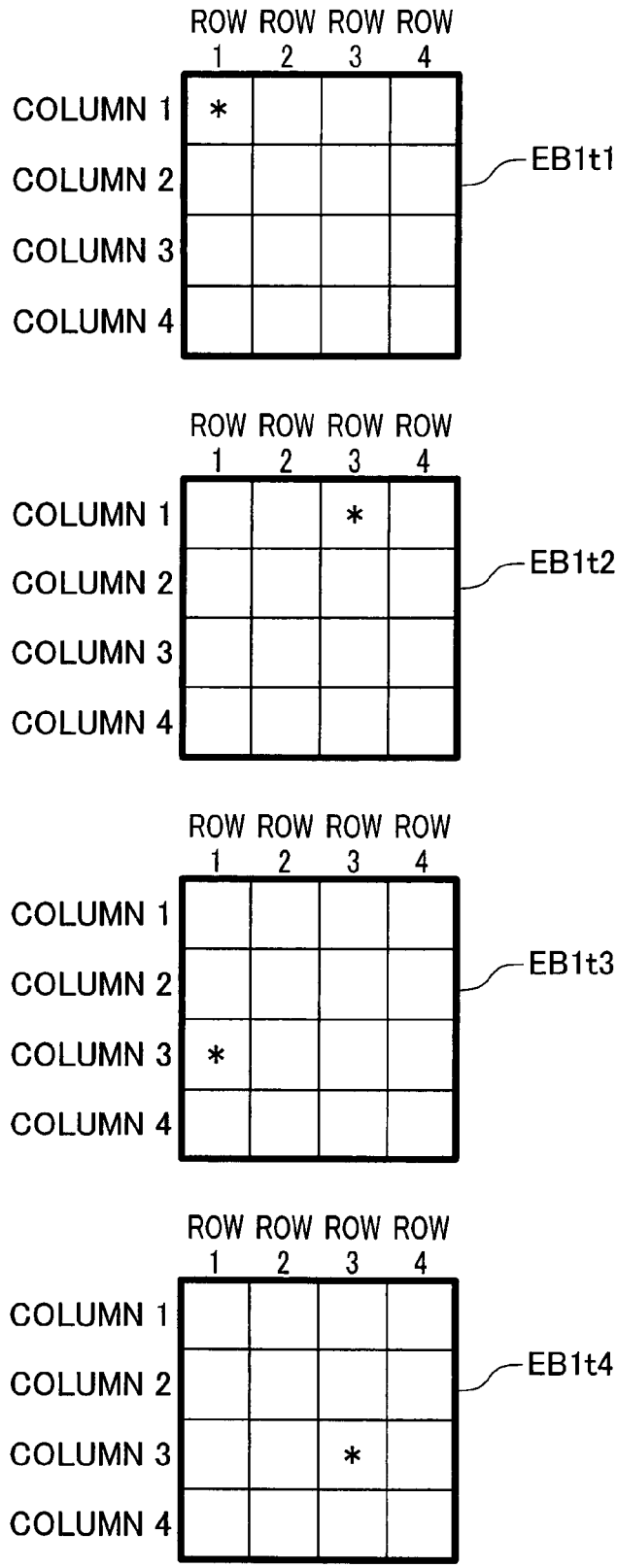
FIG. 21 shows an illustration depicting the candidate storage element selection process in Embodiment 2 of the invention.

In Step S340a, a candidate storage element selection process is carried out. The candidate storage element selection process is a process for selecting a candidate storage element from among four storage elements EB1ta-EB1t4 (FIG. 21) applicable to the element block DB1 and the divided matrix M0. The reason for selecting from among the element of the divided matrix M0 is that the divided matrix M0 is the evaluation matrix.

FIG. 22 shows a dot density matrix Ddma of digitized values representing On/Off states for dots formed on pixels corresponding to elements of the dither matrix M, and a dot density matrix Ddmg of digitized values representing On/Off states of dots formed on pixels corresponding to elements of the divided matrix M0 only. The dot density matrix Ddma is a matrix containing a digitized value representing the On state of a dot formed on a candidate storage element, in addition to digitized values representing the dot-On state of each of the eight pixels that correspond to the eight elements already determined as storage elements for threshold values. The dot density matrix Ddmg, on the other hand, is a matrix containing a digitized value representing the dot-On state of a candidate storage element, in addition to digitized values representing the dot-On state of each of the two pixels that correspond to elements in the divided matrix which, among the eight elements already determined as storage elements for threshold values, correspond to the elements of the divided matrix M0.

In the present embodiment, the dot density matrix Ddma corresponds to the "first dot On/Off state" recited in the claims, and the dot density matrix Ddmg corresponds to the "second dot On/Off state" recited in the claims.

On the basis of the dot density matrices generated in this way there are computed, for each individual candidate storage element (FIG. 21), a group graininess index which is the graininess index of the dot pattern of the first pixel group (FIG. 5) corresponding to the divided matrix M0, and a total graininess index which is the graininess index of the dot patterns of all pixel groups (Step S370, Step S375).

In Step S380a, an overall evaluation value determination process is carried out. In the overall evaluation value determination process, an overall evaluation value is determined by adding up the total graininess indices and the group graininess indices, after assigning prescribed weights to these. In the present embodiment, as an example, the weights for total graininess indices and the group graininess indices are "4" and "1," respectively.

In Step S400 (FIG. 17), a storage element determination process is carried out in the same way as in Embodiment 1. The storage element determination process is a process for determining a storage element for a targeted threshold value (in this example, the threshold value associated with the ninth highest tendency to dot formation). In the present embodiment, the storage element is determined from among elements having the smallest overall evaluation values.

By performing this kind of process for a prescribed threshold value range established in advance in the same manner as in Embodiment 1, the dither matrix generation process for the prescribed threshold value range is brought to completion (Step S500). As in Embodiment 1, the invention may also be applied to the entire threshold value range.

In this way, in Embodiment 2, evaluation is carried out with consideration to the four divided matrices M0-M3, whereby a dither matrix optimized for an image output method can be implemented with minimal computation. In particular, in consideration of the fact that image forming methods is carried out by a wide variety of methods, such optimization for an image forming method is extremely important in terms of implementability with minimal computation. In the present embodiment, the overall evaluation value corresponds to the "matrix evaluation value representing a correlation with a prescribed objective state" recited in the claims. With such an arrangement, it will be preferable for the density of dot formation for each pixel location group to be uniform with respect to input tone values.

In Embodiment 2 as well, in the event that an optimal element is situated adjacently to the outer border of the element block to which it belongs, the optimality of the dither matrix may be enhanced by means of a Modification Example described later, in the same way as in Embodiment 1.

Figure 23:
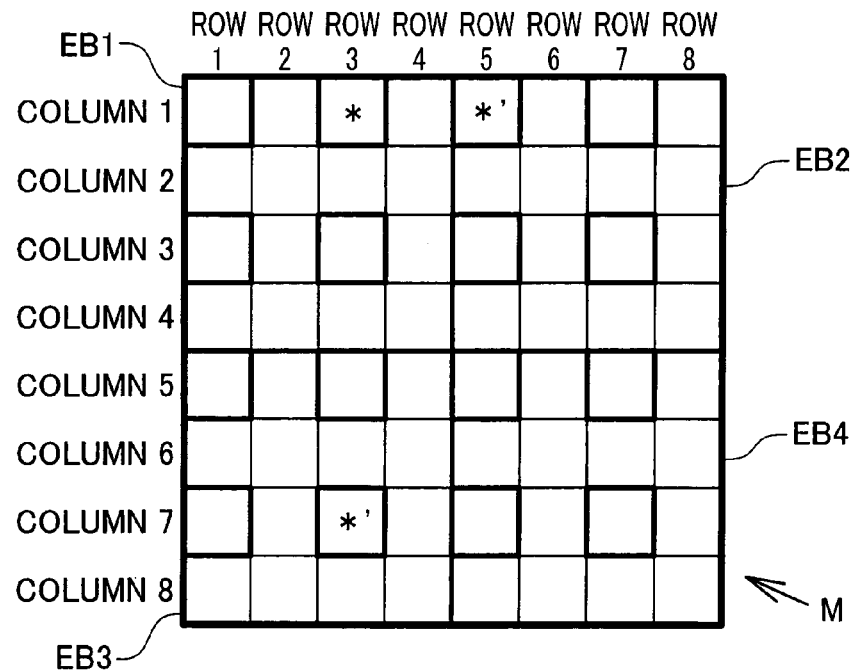
FIG. 23 shows an illustration depicting selection of a new element block in the Modification Example of Embodiment 2.

FIG. 23 is an illustration depicting selection of a new element block in the Modification Example of Embodiment 2. The Modification Example of Embodiment 2 differs from the Modification Example of Embodiment 1 in that only the storage elements of a given group are focused on in selection of the new element block. In the Modification Example of Embodiment 1, where it is presupposed that the dither matrix is used continuously along the horizontal and vertical, the storage element of Row 1/Column 3 of the element block EB1 is considered as adjacent to the boundaries with the two element blocks EB2, EB3. As a result, in the event that the storage element of Row 1/Column 3 is now the optimal element of element block EB1, the two storage elements of Row 1/Column 5 and Row 7/Column 3 will be added to the candidate storage elements. In the present embodiment, the "storage element of Row 1/Column 3" corresponds to the "elements located adjacently to outside of an outer border of the element block" recited in the claims.

Figure 24:
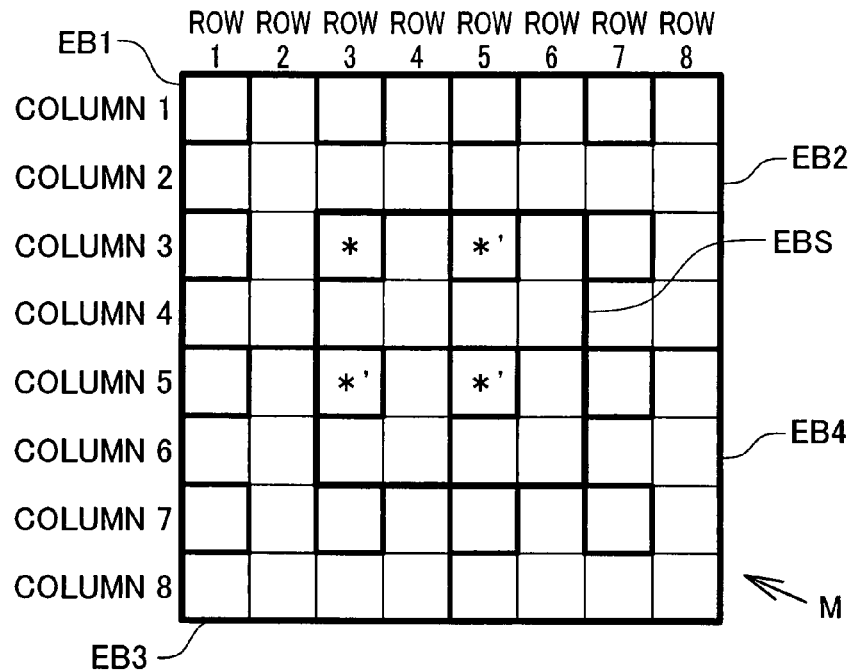
FIG. 24 shows an illustration depicting another example of selection of a new element block in the Modification Example of Embodiment 2.

FIG. 24 is an illustration depicting another example of selection of a new element block in the Modification Example of Embodiment 2. As will be understood from FIG. 24, in the Modification Example of Embodiment 2 as well, it is acceptable to carry out shifting to the element block EBS.

C. MODIFICATION EXAMPLES

While certain preferred embodiments of the invention have been shown hereinabove, the invention is in no way limited to these particular embodiments, and may be reduced to practice in various other ways without departing from the scope thereof. For example, the invention makes possible optimization of dither matrices for modification examples like the following.

C-1. Modification Example 1

In the preceding embodiments, element blocks are selected by the Bayer method, and optimal elements are determined on the basis of the graininess index; however, since it suffices merely for threshold values with successive values be distributed evenly throughout the entire dither matrix, selection of element blocks and determination of optimal elements could be carried out by methods such as the following, for example.

(1) An element block may be selected by a random method, and the element having the smallest potential cumulative value representing dot density after a low pass filter process designated as the optimal element.

(2) An element block may be shifted by the equivalent of a number of elements determined as a random number, and the optimal element determined on the basis of the graininess index.

In this way, by means of various methods, element blocks can be selected so as to avoid threshold values with successive values from becoming concentrated in one part of the dither matrix, and optimal elements can be determined from element blocks selected so as to afford good distribution.

C-2. In the preceding embodiments, the graininess index is employed as the evaluation criterion for the dither matrix, but it would be possible to instead use RMS granularity, such as will be described later, for example. This evaluation criterion can be determined by using a low pass filter (FIG. 25) to perform a low pass filter process on dot density values, and then use the computational equation given in FIG. 26 to compute the standard deviation for the density values subjected to the low pass filter process.

C-3. In the preceding embodiments, the graininess index or RMS granularity are evaluation values representing correlation with a prescribed objective state; however, it would be possible to instead designate blue noise characteristics or green noise characteristics as the prescribed objective state, and to optimize the characteristics of the dither matrix so as to bring it into approximation with these characteristics.

C-4. In the preceding embodiments, the evaluation process is performed on each storage element of a single threshold value; however, the invention may be implemented as well in cases where storage elements of a plurality of threshold values are determined at the same time. As a specific example, in the embodiments described previously, where the storage elements for threshold values up to the sixth one have been determined, and the storage elements for the seventh and eighth threshold values are now being determined, these storage elements could be determined on the basis of the evaluation value in the case where a dot is added to the storage element of the seventh threshold value and the evaluation value in the case where a dot is added respectively to the storage elements of the seventh and eighth threshold values; or only the storage element for the seventh threshold value determined.

C-5. The invention can minimize the number of iterations of evaluation computations in the optimization process, and thus can be implemented irrespective of the optimization method. For example, it can be implemented broadly in the optimization techniques of simulated annealing or genetic algorithms.

C-6. A printing device or printing method employing dither matrices generated in this way may also be implemented. Arrangements such as the following may be implemented, for example.

Figure 27:
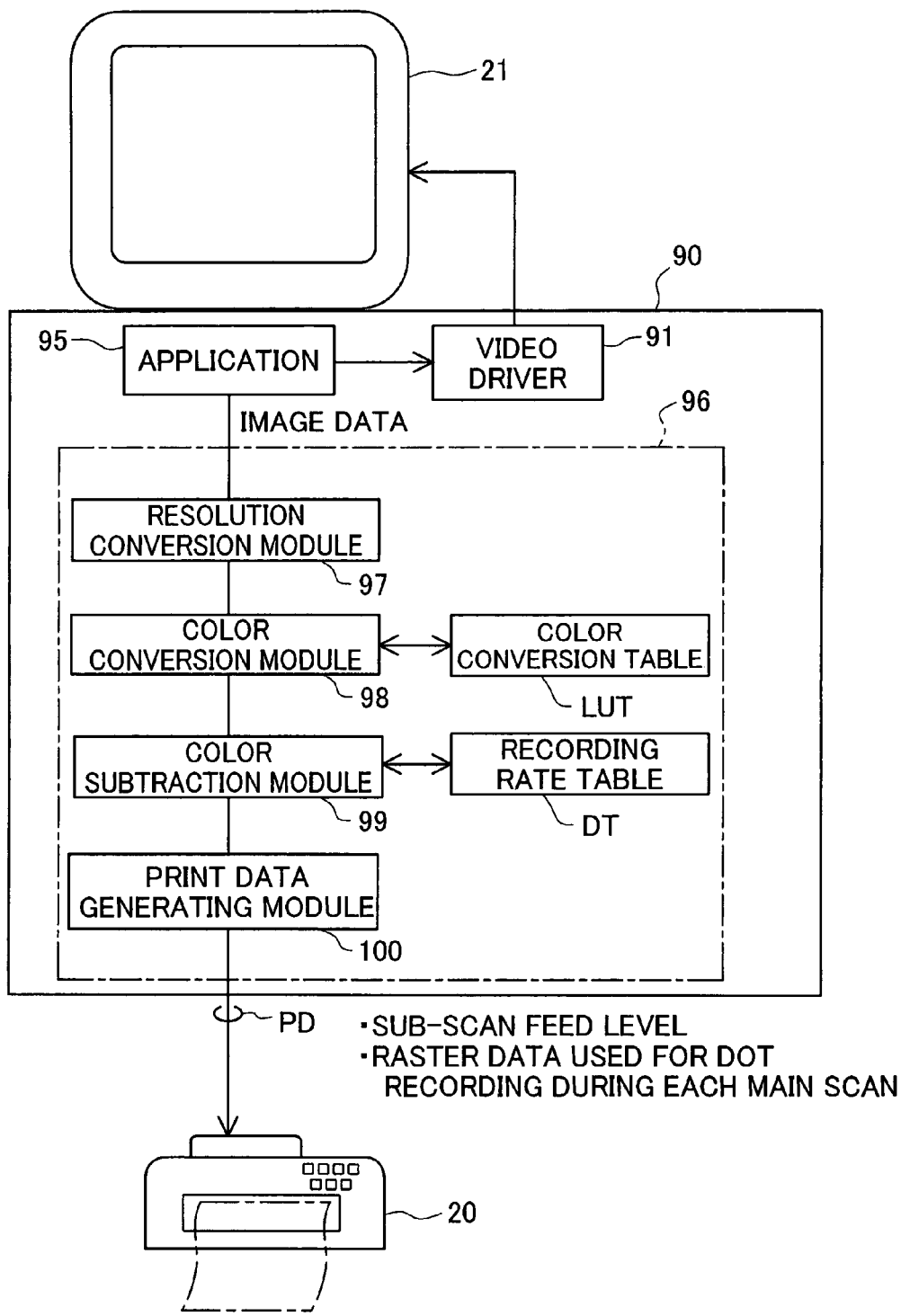
FIG. 27 shows a block diagram depicting the arrangement of a printing system in a modification example of the invention.

FIG. 27 is a block diagram depicting the arrangement of a printing system in modified example of the invention. This printing system is furnished with a computer 90 functioning as the printing control device; and a color printer 20 functioning as the printing portion. The color printer 20 and the computer 90 can be termed a "printing device" in the broad sense.

On the computer 90, an application program 95 is run on a prescribed operating system. The operating system incorporates a video driver 91 and a printer driver 96; print data PD for transfer to the color printer 20 is output from the application program 95 via these drivers. The application program 95 performs desired processing on images targeted for processing, and outputs images to a CRT via the video driver 91.

Inside the printer driver 96 are a resolution conversion module 97 for converting the input image resolution to the printer resolution; a color conversion module 98 for color conversion from RGB to CMYK; a color subtraction module 99 for using the dither matrix generate in the embodiments discussed above to perform color subtraction of input tone values and derive output tone values that can be represented by forming dots; a print data generating module 100 for using the color subtraction data to generate print data to be sent to the color printer 20; a color conversion table LUT serving as the basis for color conversion by the color conversion module 98; and a recording rate table DT for determining recording rates of dots of each size for the purpose of the color subtraction process. The printer driver 96 corresponds to a program for implementing the function of generating the print data PD. The program for executing the functions of the printer driver 96 is provided in a form recorded on a computer-readable recording medium. Such recording media could include a flexible disk, CD-ROM, magnetooptical disk, IC card, ROM cartridge, punch card, printed material having a bar code or other symbol imprinted thereon, a computer internal memory device (e.g. RAM, ROM, or other memory) or external memory device, or various other such computer-readable media.

Figure 28:
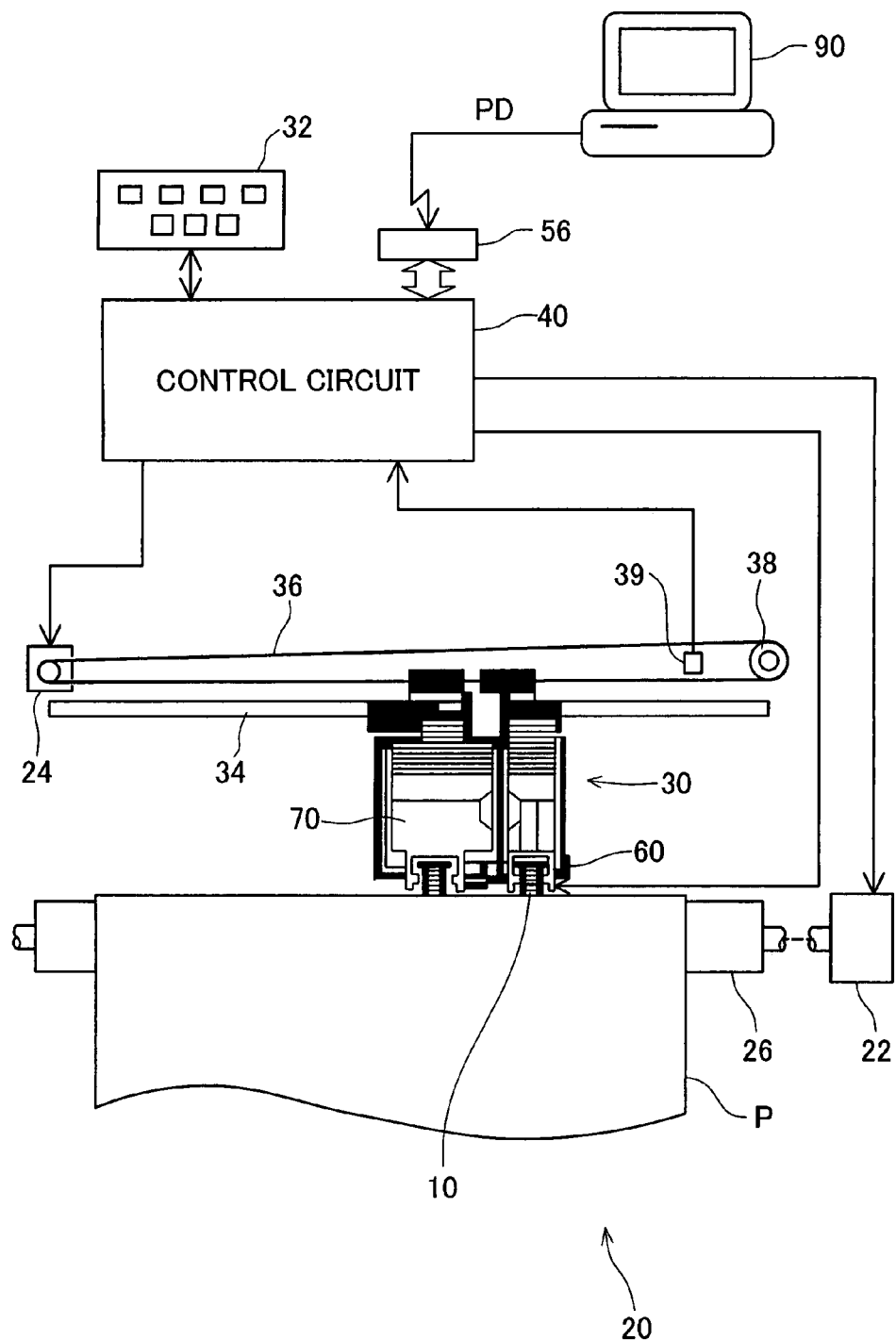
FIG. 28 shows a schematic illustration of the color printer 20.

FIG. 28 is a schematic illustration of the color printer 20. The color printer 20 is equipped with a sub-scan driving portion for transporting printing paper P in the sub-scanning direction by means of a paper feed motor 22; a main scan driving portion for reciprocating a carriage 30 in the axial direction of a feed roller 25 (main scanning direction) by means of a carriage motor 24; a head drive mechanism for driving a print head unit 60 installed on the carriage 30 (also termed the "print head assembly") and controlling ink ejection and dot formation; and a control circuit 40 for exchange of signals with the paper feed motor 22, the carriage motor 24, the print head unit 60 equipped with a print head 10, and a control panel 32. The control circuit 40 is connected to the computer 90 via a connector 56.

The color printer 20 having the hardware configuration described above reciprocates the carriage 30 by means of the carriage motor 24 while advancing the printing paper P, while at the same time driving piezo elements provided to the print head 10 to eject ink drops of each color, whereby ink dots of large, medium, and small size can be formed to produce a visual system on the printing paper P or an image optimized for the color printer 20.

Finally, the present application claims the priority based on Japanese Patent Application No. 2006-074170 filed on Mar. 17, 2006 is herein incorporated by reference.

What is claimed is:

1. A dither matrix generating method of generating a dither matrix for determining a status of dot formation on each of print pixels of a print image to be formed on a print medium in response to input image data, the method comprising:

determining a targeted threshold value from among a plurality of threshold values, the targeted threshold value having a highest tendency for dot formation to be On among threshold values for which storage elements are to be determined;

determining a storage element for the targeted threshold value from among a plurality of candidate storage elements based on a matrix evaluation value, the matrix evaluation value representing a correlation with a prescribed objective state, the matrix evaluation value being calculated respectively on a presupposition of hypothetical dot On/Off states, the hypothetical dot On/Off states resulting from the targeted threshold value being stored in each of the plurality of candidate storage elements that are candidates for storing the targeted threshold value; and repeating the determining the targeted threshold value and the determining the storage element for at least part of the plurality of threshold values, wherein the determining the storage element includes:

extracting an element block that constitutes a group of the storage elements, the element block making up a part of the dither matrix; and selecting the candidate storage elements in succession from among the plurality of storage elements that make up the extracted element block.

2. The method according to claim 1, wherein the print image is formed by mutually combining dots formed on print pixels belonging to each of a plurality of pixel groups for which a physical difference is assumed with dot formation, in a common print area, wherein the determining the storage element includes:

determining a total evaluation value that is an evaluation value that represents correlation between a first dot On/Off state and the prescribed objective states based on the first dot On/Off state, the first dot On/Off state being dot On/Off state of the print image;

determining a group evaluation value that is an evaluation value representing correlation between a second dot On/Off state and the prescribed objective states based on the second dot On/Off state, the second dot On/Off state being a dot On/Off state corresponding only to elements belonging to a pixel location group, the pixel location group being to which the candidate storage elements belong, among the plurality of pixel location groups; and determining the matrix evaluation value based on the total evaluation value and the group evaluation value.

3. The method according to claim 1, wherein the determining the matrix evaluation value includes adding at least part of the elements located adjacently to outside of an outer border of the element block, to the candidate storage element in an event that the candidate storage element having the matrix evaluation value with the highest correlation to the prescribed objective state is located adjacently to inside of the outer border.

4. The method according to claim 1, wherein the evaluation value is a graininess evaluation value calculated by a computational process that includes a Fourier transformation process; and the graininess evaluation value is calculated as a product of a VTF function determined on a basis of visual spatial frequency characteristics, and a constant pre-calculated by the Fourier transformation process.

5. The method according to claim 1, wherein the evaluation value is RMS granularity calculated by a computation process that includes a low pass filter process.

6. A printing method of performing printing on a printing medium, comprising:
performing a halftone process on image data representing a input tone value of each of pixels constituting an original image, for generating dot data representing a status of dot formation on each of print pixels of a print image to be formed on the print medium; and
forming a dot on each of the print pixels for generating the print image according to the dot data, wherein
the halftone process determines the status of dot formation on each of the print pixels using the dither matrix generated using the dither matrix generating method in claim 1.

7. A printing apparatus for performing printing on a printing medium, comprising:
a dot data generator that performs a halftone process on image data representing a input tone value of each of pixels constituting an original image, for generating dot data representing a status of dot formation on each of print pixels of a print image to be formed on the print medium; and
a print image generator that forms a dot on each of the print pixels for generating the print image according to the dot data, wherein
the halftone process determines the status of dot formation on each of the print pixels using the dither matrix generated using the dither matrix generating method in claim 1.

8. A dither matrix generating apparatus for generating a dither matrix for determining a status of dot formation on each of print pixels of a print image to be formed on a print medium in response to input image data, the apparatus comprising:
a targeted threshold determining unit that determines a targeted threshold value from among a plurality of threshold values, the targeted threshold value having a highest tendency for dot formation to be On among threshold values for which storage elements are to be determined; and
a storage element determining unit that determines a storage element for the targeted threshold value from among a plurality of candidate storage elements based on a matrix evaluation value, the matrix evaluation value representing a correlation with a prescribed objective state, the matrix evaluation value being calculated respectively on a presupposition of hypothetical dot On/Off states, the hypothetical dot On/Off states resulting from the targeted threshold value being stored in each of the plurality of candidate storage elements that are candidates for storing the targeted threshold value, wherein
the storage element determining unit extracts an element block that constitutes a group of the storage elements, the element block making up a part of the dither matrix, and selects the candidate storage elements in succession from among the plurality of storage elements that make up the extracted element block.

9. A computer program product stored on a non-transitory computer readable medium for causing a computer to generate a dither matrix for determining a status of dot formation on each of print pixels of a print image to be formed on a print medium in response to input image data, the computer program product comprising: a non-transitory computer readable medium; and a computer program stored on the non-transitory computer readable medium, the computer program comprising: a first program stored on a non-transitory computer readable medium for causing the computer to determine a targeted threshold value from among a plurality of threshold values, the targeted threshold value having a highest tendency for dot formation to be On among threshold values for which storage elements are to be determined; a second program stored on a non-transitory computer readable medium for causing the computer to determine a storage element for the targeted threshold value from among a plurality of candidate storage elements based on a matrix evaluation value, the matrix evaluation value representing a correlation with a prescribed objective state, the matrix evaluation value being calculated respectively on a presupposition of hypothetical dot On/Off states, the hypothetical dot On/Off states resulting from the targeted threshold value being stored in each of the plurality of candidate storage elements that are candidates for storing the targeted threshold value; and a third program stored on a non-transitory computer readable medium for causing the computer to repeat the determining the targeted threshold value and the determining the storage element for at least part of the plurality of threshold values, wherein the second program includes: a program for causing the computer to extract an element block that constitutes a group of the storage elements, the element block making up a part of the dither matrix; and a program stored on a non-transitory computer readable medium for causing the computer to select the candidate storage elements in succession from among the plurality of storage elements that make up the extracted element block.

* * * * *